(12) United States Patent
Treiser

(10) Patent No.: US 8,943,004 B2
(45) Date of Patent: Jan. 27, 2015

(54) TOOLS AND METHODS FOR DETERMINING RELATIONSHIP VALUES

(76) Inventor: Adam Treiser, North Brunswick, NJ (US)

( * ) Notice: Subject to any disclaimer, the term of this patent is extended or adjusted under 35 U.S.C. 154(b) by 113 days.

(21) Appl. No.: 13/492,528

(22) Filed: Jun. 8, 2012

(65) Prior Publication Data

US 2013/0297543 A1    Nov. 7, 2013

Related U.S. Application Data

(63) Continuation-in-part of application No. 13/461,670, filed on May 1, 2012, now Pat. No. 8,341,101.

(60) Provisional application No. 61/633,246, filed on Feb. 8, 2012.

(51) Int. Cl.
*G06N 5/00* (2006.01)
*G06F 1/00* (2006.01)

(52) U.S. Cl.
USPC .............. 706/12; 707/723; 707/812; 328/157

(58) Field of Classification Search
CPC ........... G06F 15/18; G06F 1/02; G06F 17/30; G06N 5/02
See application file for complete search history.

(56) References Cited

U.S. PATENT DOCUMENTS

| | | | |
|---|---|---|---|
| 5,710,884 A | 1/1998 | Dedrick | |
| 5,754,938 A | 5/1998 | Herz et al. | |
| 6,510,420 B1 | 1/2003 | Cessna et al. | |
| 6,778,982 B1 | 8/2004 | Knight et al. | |
| 6,990,486 B2 | 1/2006 | Ma et al. | |
| 7,035,855 B1 | 4/2006 | Kilger et al. | |
| 7,117,192 B2 | 10/2006 | Waltz et al. | |
| 7,177,864 B2 | 2/2007 | Ekhaus | |
| 7,365,308 B2 | 4/2008 | Trcka et al. | |

(Continued)

FOREIGN PATENT DOCUMENTS

WO    WO2007134128    1/2007

OTHER PUBLICATIONS

Kai-Yu Wang, I-Hsien Ting, and Hui-Ju Wu, *Discovering Interest Groups for Marketing in Virtual Communities*, J Bus Res (2012)—7 pages.

(Continued)

*Primary Examiner* — Kalpana Bharadwaj
(74) *Attorney, Agent, or Firm* — Finnegan, Henderson, Farabow, Garrett & Dunner, LLP

(57) ABSTRACT

Systems, apparatus, and methods for correlating two items of interest, based on a plurality of data items and characteristics. The data items may include objective and quantitative data, as well as subjective and qualitative data. In one implementation, the relationship of an individual to a metric is determined. The system, apparatus, and methods may store characteristics describing individuals generally, along with metrics relevant to an organization; receive a plurality of data items; extract information associated with the individual from the data items; determine a number of relationships between the data items, individuals, metric, and characteristics; and use the relationships to determine an overall relationship between the individual and the metric, based on the data and characteristics. In addition, related groups of characteristics may be identified. Similarly, the relationships between any individual, metric, sub-metric, group of characteristics, data item, data source, characteristic, or groups thereof may also be determined.

21 Claims, 14 Drawing Sheets

(56) References Cited

U.S. PATENT DOCUMENTS

| | | | |
|---|---|---|---|
| 7,403,910 | B1 | 7/2008 | Hastings et al. |
| 7,406,434 | B1 | 7/2008 | Chang et al. |
| 7,454,412 | B2 | 11/2008 | Diewald et al. |
| 7,546,278 | B2 | 6/2009 | Yang et al. |
| 7,949,565 | B1 | 5/2011 | Eldering et al. |
| 7,970,712 | B2 | 6/2011 | Ruvolo et al. |
| 8,010,460 | B2 | 8/2011 | Work et al. |
| 8,010,570 | B2 | 8/2011 | Sweeney |
| 8,027,864 | B2 | 9/2011 | Gilbert |
| 8,036,930 | B2 | 10/2011 | Brignull et al. |
| 8,046,797 | B2 | 10/2011 | Bentolila et al. |
| 8,082,291 | B2 | 12/2011 | Gisolfi et al. |
| 8,112,420 | B2 | 2/2012 | Yamamoto et al. |
| 2003/0033194 | A1 | 2/2003 | Ferguson et al. |
| 2004/0122681 | A1 | 6/2004 | Ruvolo et al. |
| 2004/0215500 | A1 | 10/2004 | Monahan |
| 2006/0042483 | A1 | 3/2006 | Work et al. |
| 2006/0074832 | A1 | 4/2006 | Gardner et al. |
| 2006/0248087 | A1 | 11/2006 | Agrawal et al. |
| 2007/0011183 | A1 | 1/2007 | Langseth et al. |
| 2007/0239517 | A1 | 10/2007 | Chung et al. |
| 2007/0299910 | A1 | 12/2007 | Fontenot et al. |
| 2008/0162574 | A1 | 7/2008 | Gilbert |
| 2009/0006286 | A1 | 1/2009 | Angell et al. |
| 2009/0132395 | A1 | 5/2009 | Lam et al. |
| 2009/0177644 | A1 | 7/2009 | Martinez et al. |
| 2009/0216563 | A1 | 8/2009 | Sandoval et al. |
| 2009/0240586 | A1 | 9/2009 | Ramer et al. |
| 2009/0300326 | A1 | 12/2009 | Sweeney |
| 2010/0070448 | A1 | 3/2010 | Omoigul |
| 2010/0094858 | A1 | 4/2010 | Indeck et al. |
| 2010/0114899 | A1 | 5/2010 | Guha et al. |
| 2010/0153453 | A1 | 6/2010 | Knowles |
| 2010/0179845 | A1 | 7/2010 | Davidson |
| 2010/0257028 | A1 | 10/2010 | Hillerbrand |
| 2011/0015969 | A1 | 1/2011 | Loeb |
| 2011/0887550 | | 4/2011 | Fordyce, III et al. |
| 2011/0153377 | A1 | 6/2011 | Novikov et al. |
| 2011/0213741 | A1 | 9/2011 | Shana et al. |
| 2011/0295694 | A1 | 12/2011 | Coggeshall et al. |
| 2012/0166373 | A1* | 6/2012 | Sweeney et al. ............... 706/14 |
| 2012/0185353 | A1 | 7/2012 | Goel |
| 2013/0018722 | A1* | 1/2013 | Libby ....................... 705/14.46 |

OTHER PUBLICATIONS

Cindy K.Chung et al., *Revealing Dimensions of Thinking in Open Ended Self Descriptions: an Automated Meaning Extraction Method for Natural Language*, 42 J. Research & Personality 96-132 (2008)—37 pages.
Eric Gilbert and Karrie Karahalios, *Predicting Tie Strengths With Social Media*, ACM CHI '09 Proceedings of the 27th international conference on Human factors in computing systems (2009)—10 pages.
Tom Dubois, et al., *Improving Recommendation Accuracy by Clustering Social Networks with Trust*, 3rd ACM Conference on Recommender Systems workshop: Recommender Systems and the Social Web., (2009)—7 pages.
J. Goldbeck et al., "Predicting Personality with Social Media," Submitted for Review to CHI (2011)—10 pages.
Paul Gillan, "The New Conversation: Taking Social Media from Talk to Action," *Harvard Business Review* (2010)—24 pages.
Jim Sterne, "Text Analytics for Social Media—Evolving Tools for an Evolving Environment," *White Paper* (2010)—17 pages.
Search BusinessAnalytics.com Tip Guide: 'Big Data' Finds Ally in Predictive Analytics, but Combo Requires Care, *TechTarget Business Applications and Analytics Media*—7 pages.
Sarah Perez, "How Twitter Is Pairing Its Interest Graph With Ads," *TechCrunch* (2012)—2 pages.
Michael Chui et al., "The Impact of Big Data on Payments," 2012—7 pages.
Mark R. Gilbert et al. "Planning for 2012: Uncover Synergies from ECM and BI Investments" *Gartner, Inc.*, ID:G002176545 (2011)—5 pages.

Y. Bachrach et al., "Personality and Patterns of Facebook Usage," *WebSci 2012*, Jun. 22-24, 2012 (9 pages).
Facebook F8: Redesigning and hitting 800 million users, *LA Times*; Sep. 2011 (3 pages).
Y. Amichai-Hamburger and G. Vinitzky, "Social Network Use and Personality," *Computers in Human Behavior*; 26:1289-1295, 2010 (7 pages).
M.R. Barrick and M.K. Mount, "The Big Five Personality Dimensions and Job Performance: A Meta-Analysis," *Personnel Psychology*, 44(1):1-26, 1991 (26 pages).
C.M. Bishop, "Pattern Recognition and Machine Learning", vol. 4, Springer New York, 2006 (19 pages).
D. Byrne, W. Griffitt, and D Stefaniak, "Attraction and Similarity of Personality Characteristics," *Journal of Personality and Social Psychology*, 5(1):82-90, 1967 (9 pages).
T. Correa, A. W. Hinsley, and H.G. De Zuniga, "Who Interacts on the Web?: The Intersection of Users' Personality and Social Media Use," *Computers in Human Behavior*; 26:247-253, 2009 (7 pages).
P.T. Costa Jr. and R.R. McCrae, "NEO Personality Inventory-Revised (NEO-PI-R)and NEO Five-Factor inventory (NEO-FFI) Professional Manual," Odessa, FL,:*Psychological Assessment Resources*, 1992 (5 pages).
D.C. Evans: S.D. Gosling, and A. Carroll, "What Elements of an Online Social Networking Profile Predict Target-Rater Agreement in Personality Impressions," *In Proceedings of the International Conference on Weblogs and Social Media*, pp. 1-6 2008 (6 pages).
A. Finder, "When a Risqué Online Persona Undermines a Chance for a Job," New York Times, Jun. 11, 2006 (2 pages).
L.R. Goldberg, "The Structure of Phenotypic Personality Traits:" *American Psychologist*, 48(1):26-34, 1993 (9 pages).
L.R. Golberg. "A Broad-Bandwidth, Public Domain, Personality Inventory Measuring the Lower-Level Facets of Several Five-Factor Models:" *Personality Psychology in Europe*. 777-23, 1999 (22 pages).
L R. Goldberg, J.A. Johnson, H.W. Eber, R. Hogan, M.C. Ashton, C.R. Cloninger, and H.G. Gough, The International Personality Item Pool and the Future of Public-Domain Personality Measures, *Journal of Research Personality*, 40:34-96: 2006 (available online 2005) 18 pages.
S.D. Gosling, A.A. Augustine, S. Vazire, N. Holtzman, and S. Gaddis, "Manifestations of Personality in Online Social Networks: Self-reported Facebook-related Behaviors and Observable Profile Information," *Cyberpsychology, Behavior, and Social Networking*, 14(9);483-488, 2011 (6 pages).
S.D. Gosling, S. Gaddis, and S. Vazire, "Personality Impressions Based on Facebook Profiles," *ICWSM*, 2007 (4 pages).
G. Holmes, A. Donkin, and I.H. Witten, "WEKA: A Machine Learning Workbench," Intelligent Information Systems, 1994, Proceedings of the 1994 Second Australian and New Zealand Conference on, *IEEE*, pp. 357-361, 1994 (5 pages).
T.A. Judge, C.A. Higgins, C.J. Thoresen, and M.R. Barrick, "The Big Five Personality Traits, General Mental Ability, and Career Success Across the Life Span," *Personnel Psychology*, 52(3):621-652, 1999 (32 pages).
E.L. Kelly and J.J. Conley, "Personality and Compatibility: A Prospective Analysis of Marital Stability and Marital Satisfaction," *Journal of Personality and Social Psychology*, 52(1):27-40, 1987 (14 pages).
Office Action issued in U.S. Appl. No. 13/621,717, Mailed Dec. 19, 2012 (23 pages).
D.J. Ozer and V. Benet-Martinez, "Personality and the Prediction of Consequential Outcomes," *Annu. Rev. Psychol.*, 57:401-421, 2006 (available online 2005) 23 pages.
PCT International Search Report and Written Opinion of PCT Application No. PCT/US 2012/61642, dated Feb. 5, 2013 (17 pages).
PCT International Search Report and Written Opinion of PCT Application No. PCT/US 2013/24119, dated Apr. 8, 2013 (19 pages).
PCT International Search Report and Written Opinion of PCT Application No. PCT/US 2013/025070, dated Apr. 15, 2013 (11 pages).
PCT International Search Report and Written Opinion of PCT Application No. PCT/US 2013/025128, dated Apr. 16, 2013 (13 pages).

(56) References Cited

OTHER PUBLICATIONS

C. Ross, E.S. Orr, M. Sisic, J.M. Arseneault, M.G. Simmering, and R. Robert Orr, "Personality and Motivations Associated with Facebook Use," *Computers in Human Behaviors*, 25:578-586, 2009 (9 pages).

M.T. Russell and D.L. Karol, "The 16PF Fifth Edition Administrators Manual," *Institute for Personality and Ability Testing Campaign*, IL, 1994 (10 pages).

T. Ryan and S. Xenos, "Who Uses Facebook? An Investigation into the Relationship Between the Big Five, Shyness, Narcissism. Loneliness, and Facebook Usage," *Computers in Human Behavior*, 27:1658-1664, 2011 (7 pages).

R.P. Tett, D.N. Jackson, and M. Rothstein, "Personality Measures as Predictors of Job Performance: A Meta-analytic Review," *Personnel Psychology*: 44:703-742, 1991 (40 pages).

E.C. Tupes and R.E. Christal, "Recurrent Personality Factors Based on Trait Ratings," *Journal of Personality*, (60(2):225-251, 1992 (released for publication in 1961 (28 pages).

S. Zhao, S. Grasmuck, and J. Martin, "Identity Construction on Facebook: Digital Empowerment in Anchored Relationships," *Computers in Human Behavior*, 24:1816-1836, 2008 (21 pages).

B. Zhong, M. Hardin, and T. Sun, "Less Effortful Thinking Leads to More Social Networking? The Association Between the Use of Social Network Sites and Personality Traits," *Computers in Human Behavior*, 27:1265-1271, 2011 (7 pages).

PCT International Search Report mailed Apr. 26, 2013 for International Application No. PCT/US 13/24060 filed Jan. 31, 2013 (15 pages).

\* cited by examiner

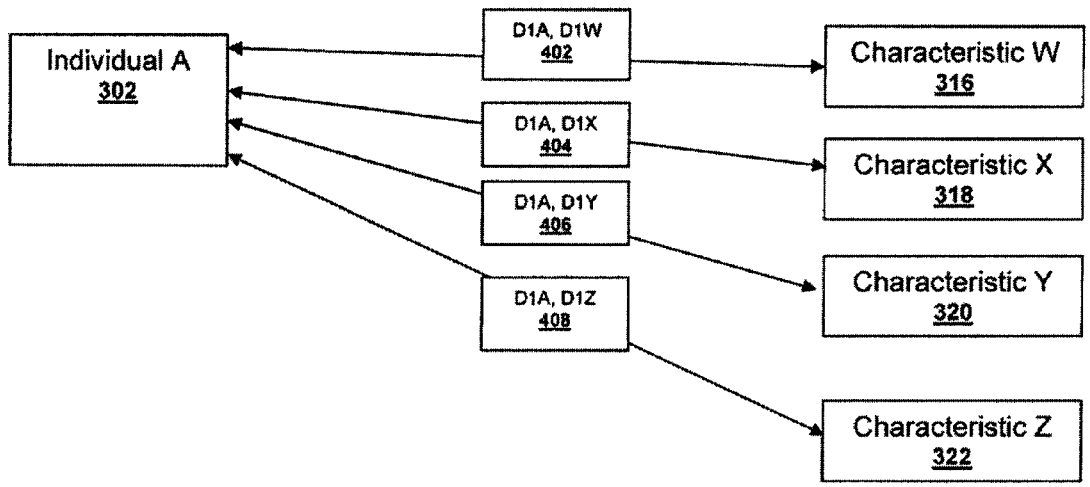
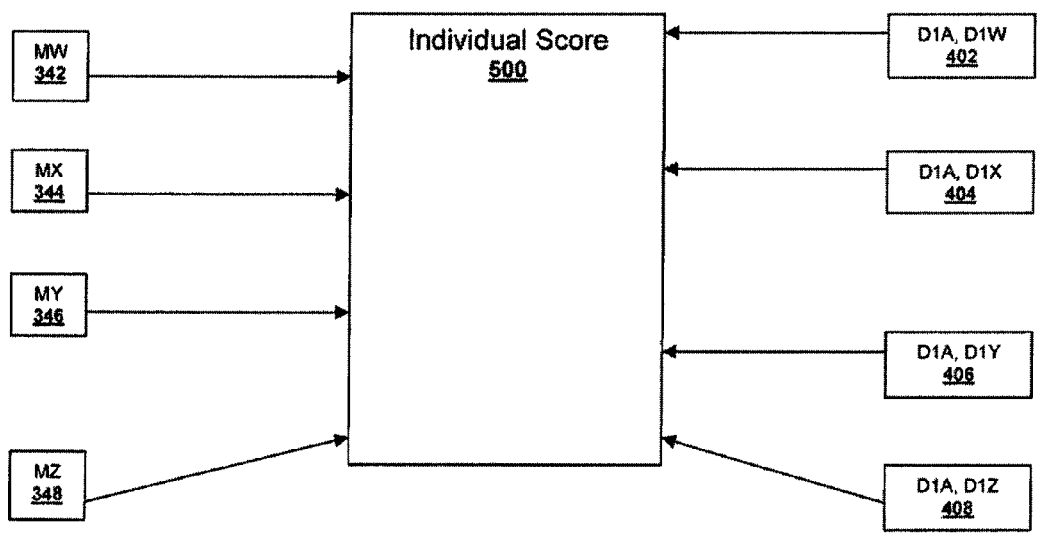

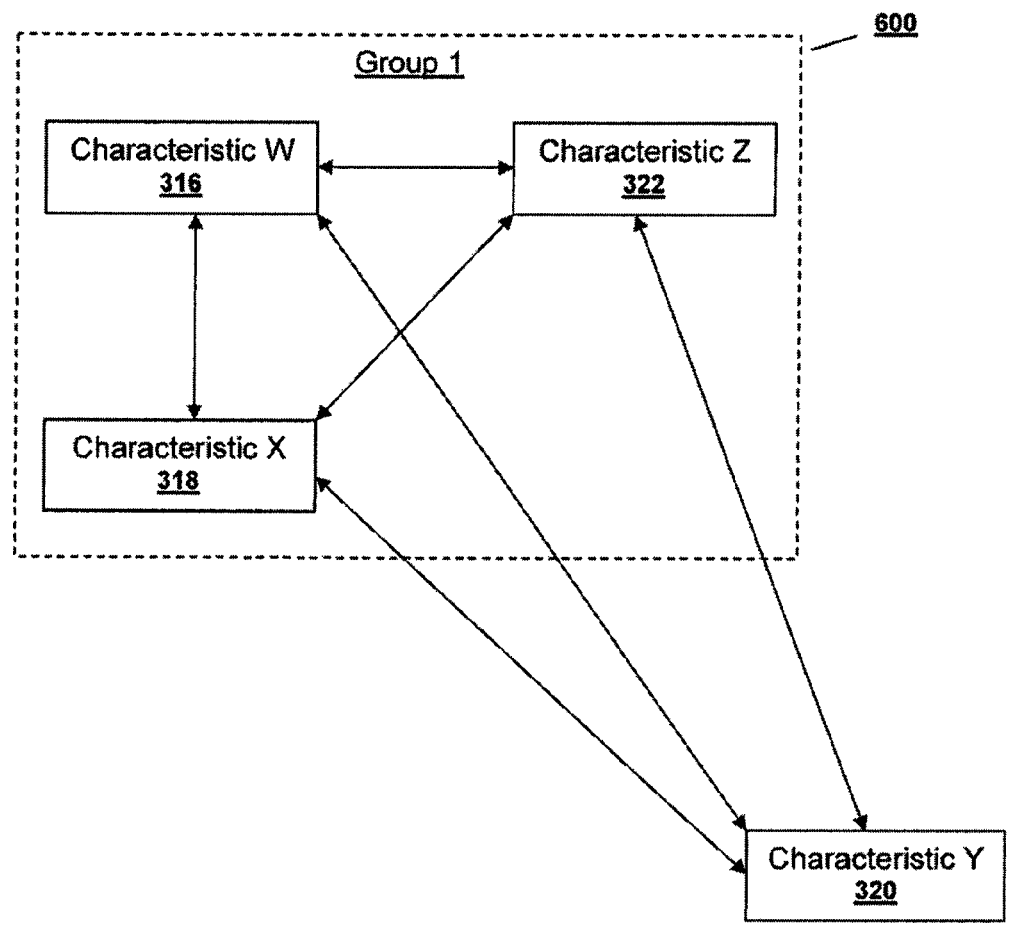

TOOLS AND METHODS FOR DETERMINING RELATIONSHIP VALUES

INCORPORATIONS BY REFERENCE

This application claims priority to U.S. patent application Ser. No. 13/461,670, filed on May 1, 2012 (now U.S. Pat. No. 8,341,101) and titled "Tools and Methods for Determining Relationship Values," which claims the benefit of priority to U.S. Provisional Application No. 61/633,246, filed Feb. 8, 2012, each of which incorporated herein by reference in its entirety.

BACKGROUND

1. Technical Field

The present invention relates to characteristic-based profiling systems and, more particularly, to combining multiple points of data regarding individuals through the use of characteristics in order to determine the relationship between the individuals and a user-defined criteria.

2. Description of the Related Art

Customer profiling systems are known in the art. Traditional systems include consumer rewards cards, credit card purchase information, demographic profiling, behavioral profiling, and customer surveying. Some businesses supplement these traditional systems with website and social media analytic tools that profile the business's fans and followers according to factors such as "likes," "click-through rates," and search engine queries, among others. Generally, these systems attempt to determine products, promotions, and advertisements that are most likely to appeal to a specific customer or broad customer segment. This information helps businesses forecast future market behavior, manage their product portfolio and inventory levels, adjust product pricing, design marketing strategies, and determine human resource and capital investment needs in order to increase revenue, market share, and profitability. For example, advertising targeted at customers who are most likely to purchase a product may be more effective than advertising targeting broader audiences. Likewise, products that are related to one another are likely to be purchased by the same customer and may sell better if offered at the same time, whether as a package or as separate items. Online retailers often use a similar approach, suggesting items that other customers frequently purchase in conjunction with the selected item.

While most approaches create basic customer profiles, these profiles do not reflect the myriad similarities between customers or the numerous ways in which customers can be grouped. For example, most approaches generally provide profiles on either an individual customer or an overly broad customer segment (for example, all women ages 25-34 with a college degree), failing to reflect the various degrees of granularity with which customers can be grouped. One type of approach typically uses only historical, static, and quantitative or objective information. As a result, customer profiles created by these approaches are generally outdated and inaccurate, and fail to account for the vast amount of potentially rich, but qualitative and subjective, information about the customer that is available to most businesses. A second type of approach uses only subjective or qualitative information. These approaches also have drawbacks. Typically they use expensive and time-consuming methods such as customer surveys or focus groups. Due to the nature of the setting, the results may not accurately reflect the attitudes or opinions of the surveyed individuals. Due to the expense and time involved, only a limited number of individuals may be surveyed. Likewise, the purchasing suggestions created by these systems are often inaccurate. For example, while many customers who purchase item A also purchase item B, that information does not provide any insight into what a specific customer, or group of customers, may be interested in.

Additionally, customer information is often collected with respect to a single business metric and may never be used to glean insights about other metrics that may be helpful to the company. This is particularly true for businesses that are growing and those that have multiple departments. Growing businesses must usually adjust or supplement its performance metrics to reflect new goals, strategies, and business operations. As a result, these businesses must understand how its customers relate to the new set of business metrics rather than, or in addition to, the ones for which the data was originally collected. Similarly, businesses with multiple departments frequently gather customer information for purposes of a department-specific metric, but fail to use that information across other departments or globally within the organization. For example, a business may have a marketing department and risk management department. Customer information gathered by the marketing department when researching new product markets may never be seen or used by the risk management team to determine whether that customer or market poses undue risk to the business. Methods for combining this disparate data, (for example, a technique sometimes referred to as "one version of the truth analysis") do not allow the business to apply the same method to external data it may be interested in. Furthermore, these systems are used only to organize the information and are not useful for analyzing it.

In the advertising, marketing, and public relations fields, businesses often tailor their communications with existing or potential consumers, investors, employees and others. These communications are tailored, to the greatest extent possible, for the business' purpose in sending the message and for the individual(s) who are intended to receive the message. Tailoring the message appropriately has become increasingly more difficult with the advent of real-time messaging, targeted advertising, social media, viral campaigns, and more. These communication platforms require businesses to communicate with the intended recipient as if on a 1-to-1 basis. Nevertheless, tailoring the message appropriately is only becoming more important as doing so often increases conversion rates, click-through rates, sales, and other barometers of an advertising, marketing or PR campaign's success. As discussed above, systems that use basic profiling techniques result in customer profiles that are generally outdated and inaccurate. As a result, these systems do not allow these businesses to tailor their message as narrowly as possible for each individual, or group.

For example, "cookies" are used to track and monitor user behavior on the Internet in order to measure the effectiveness of an advertisement, or other message. These cookies are ever more important in the Social Media context because users of such platforms frequently share content with other friends or people on the network, rather than actually clicking on the advertisement. Thus, it is increasingly important to understand the type of person who is accessing or viewing an advertisement or message; otherwise the value of such "word of mouth" marketing is greatly diminished. However, it is difficult to capture a complete profile of each individual or group of individuals through the use of cookies. Thus, there is a need for a system that can determine how effective an advertisement or message is, or will be, in reaching certain individuals or types of individuals.

In addition, many organizations attempt to collect real-time information about their customers or audience. However, this is often difficult to do with the basic profiling techniques described above. In addition, these basic techniques often cannot be performed in real time, and result in customer profiles that are generally outdated and inaccurate.

Many organizations also sell the data they collect about individuals to other organizations. Often however, this information is not very detailed. Many organizations will not (or cannot) sell sensitive or detailed information about each individual, due to privacy concerns and laws. Thus, there is a need for a system that is capable of creating a detailed profile about an individual, or group of individuals, in a way that does not reveal any identifying or sensitive information about the individual(s).

There is also a need for a system that can create a predictive profile of an individual, or group of individuals, in order to predict future behavior and performance. Many organizations attempt to track the performance of individuals. For example, large companies attempt to track employee performance, to determine which employees perform well, and which are likely to perform well in the future. These companies also attempt to determine how well each job candidate is likely to perform, if they were given a job with the company. Thus, there is a need for a system that can create a detailed profile about an individual or group of individuals, and determine how that profile relates to certain performance characteristics. There is also a need for a system that can provide this information without revealing sensitive information, or information the employer is not allowed to consider as a factor, about each individual, In business environments where team projects and collaboration play a significant role, many companies struggle to assemble the most effective teams. Often, managers and human resource departments assemble teams on the basis of employees' skill sets, seniority, and/or experience. However, factors such as shyness, social dominance, creativity, leadership, the ability to officiate and foster an open and collaborative work environment, among many others, are not formally taken into consideration when assembling a team. Even when a business recognizes the importance of these and other subjective factors, they are not formally included in the analytical process because such factors are expensive and obtrusive to measure, based upon inconsistent or inaccurate anecdotes, or are measured through historical performance and peer assessment reviews. These basic systems do not provide real time feedback to team members regarding its performance with respect to critical subjective criteria, such as identifying overly-dominant team members who are drowning out others, identifying "free-riders", identifying harmful "intra-group cliques", identifying power-struggles within a team, or identifying detrimental body language, tone-of-voice, or communication habits. Thus, the basic systems do not enable a business to address these important group dynamic issues until after it is too late.

Characteristic based screening can also be used to identify which individuals have a greater propensity to be a terrorist, sex-offender, or spy. Basic systems rely on identifying known associations between an individual and other potentially harmful or threatening people or organizations. These associations, however, do not enable a government agency to measure "grey areas" of a person. For example, two individuals may be nearly identical in their known associations, but one person is often angry, vengeful, and has an explosive temperament. In contrast, the second individual may be characterized by spirituality, self-evaluation, and ambition. As a result, the first individual may have a greater correlation with anti-social behavior and should not be trusted.

One of the most difficult aspects facing businesses today is how to measure the value of its connections and affiliations on social media platforms. Specifically, there is a need to understand and measure characteristics such as an affiliated individual's reach, the strength of the connection between the individual and the business, the strength of the connection between the individual and his or her personal social network and sub-networks, and the trustworthiness of the connection with the individual, the density of the business' social network and that of its "fans", "followers", and "likes." This would enable a business to measure its connections, understanding which connections reach the most people, have the greatest impact on people (and which people), have the greatest ability to motivate action in others, and are interested in topics affiliated or connected, either directly or indirectly, with the business. All of this may then be correlated back to the business' own metrics, so that it may know who is a valuable social media connection, when, and for what reason.

As a result, there is a need for a system that addresses the issues above.

SUMMARY

In the following description, certain aspects and embodiments of the present invention will become evident. It should be understood that the invention, in its broadest sense, could be practiced without having one or more features of these aspects and embodiments. It should also be understood that these aspects and embodiments are merely exemplary.

Consistent with an exemplary embodiment of the present invention, there is provided a computer-readable non-transitory storage medium having instructions which, when executed on a processor, perform a method for identifying relationships between individuals, metrics, and sub-metrics, using characteristics.

It is to be understood that both the foregoing general description and the following detailed description are exemplary and explanatory only, and are not restrictive of the invention, as claimed. Further features or variations may be provided in addition to those set forth herein. For example, the present invention may be directed to various combinations and sub-combinations of the disclosed features, or combinations and sub-combinations of several further features disclosed below in the detailed descriptions.

BRIEF DESCRIPTION OF THE DRAWINGS

The accompanying drawings, which are incorporated in and constitute a part of this specification, illustrate embodiments and together with the description, serve to explain the principles of the invention. In the drawings:

FIG. 4 is a block diagram depicting an example of relationships between individuals and characteristics;

FIG. 5 is a block diagram depicting an example score for an individual related to a metric;

FIG. 6 is a block diagram depicting an example group of characteristics;

DETAILED DESCRIPTION OF EXEMPLARY EMBODIMENTS

Figure 1:
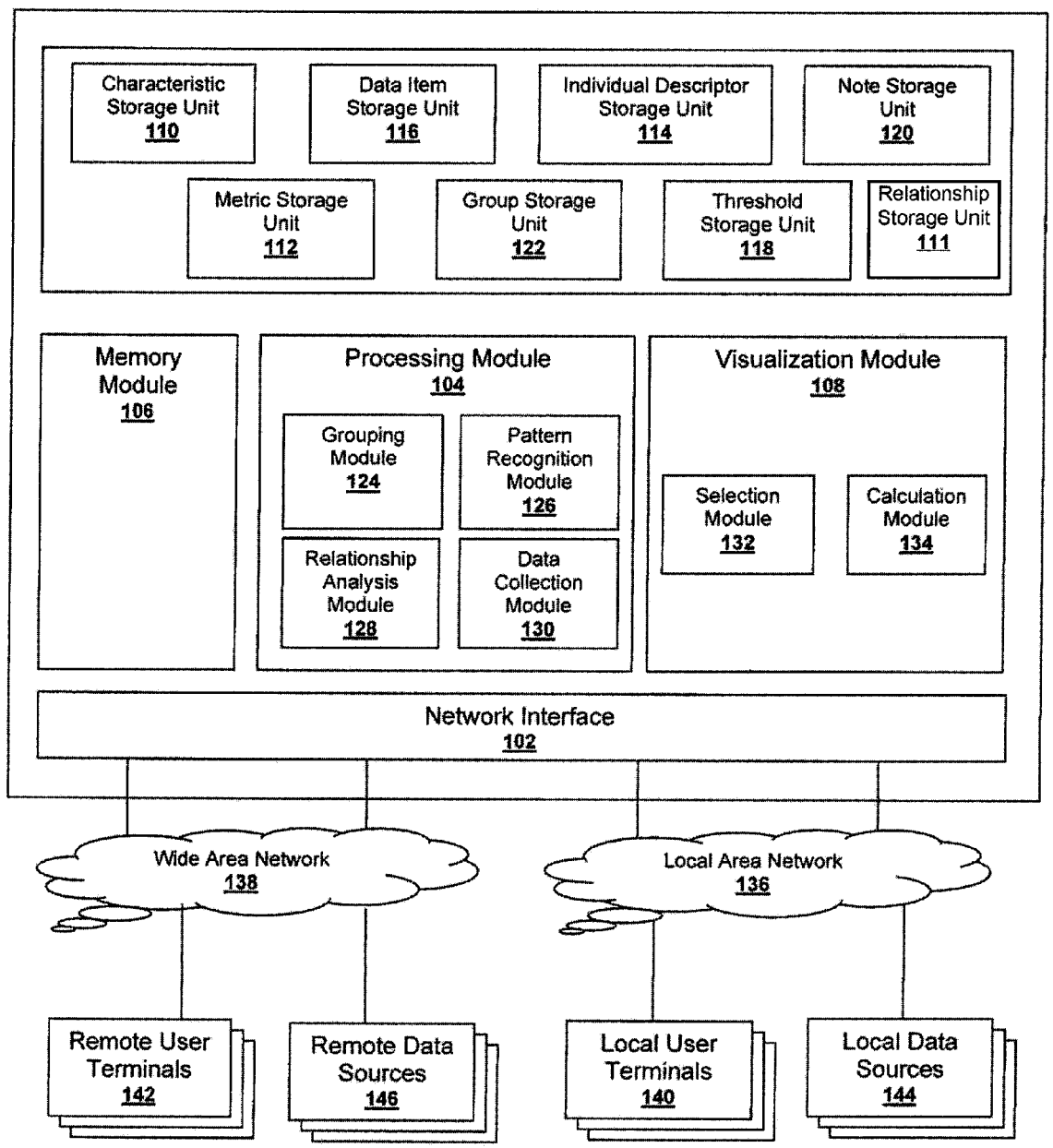
FIG. 1 is a block diagram of an exemplary embodiment of a characteristic-based server.

Reference will now be made in detail to an exemplary embodiment of the invention, an example of which is illustrated in the accompanying drawings. Wherever possible, the same reference numbers will be used throughout the drawings to refer to the same or like parts. It is apparent, however, that the embodiments shown in the accompanying drawings are not limiting, and that modifications may be made without departing from the spirit and scope of the invention.

Systems and methods consistent with the invention provide a characteristic-based system for identifying, organizing, describing, and visualizing relationships between a business's metrics and individuals. To this end, the characteristic-based system may define a number of characteristics. As used herein, the term characteristic broadly refers to any attribute, trait, value, or other factor associated, whether objectively or subjectively, with an individual or group of individuals. The detailed description below provides further examples of such characteristics. When receiving information about an individual, the characteristic-based system may use a suitable relationship-determining module comprising relationship-determining algorithms known in the art to determine the relationship between the information and the characteristics. This relationship may be described using both a magnitude and a direction. Further, the description may be represented by a numerical value, textual identifier, graphical icon, color, opacity, or any other suitable method of representing the relationship. The magnitude may represent how strongly the information is related to the characteristics, including the lack of any relationship at all. The relationship may also be identified as positive, negative, or neutral. The term "positive" broadly refers to relationships where the existence of, or a change in, one member of the relationship corresponds to a similar existence of, or a similar change in, the other members. The term "negative" broadly refers to relationships where the existence of, or a change in one member of the relationship corresponds to a lack of the existence of, or an inverse change in, the other members. The term "neutral" broadly refers to a relationship where the existence of, or a change in one member of the relationship does not correspond to any existence or change in the other members.

The system may also receive a plurality of descriptors, identifying or describing specific individuals. The system may use a similar relationship-determining module to identify which individual, or individuals, are the most strongly related to the information. Again, the relationships may include a magnitude, and/or a direction identified as positive, negative, or neutral. In this way, the system may further determine the relationship between the individuals and the characteristics. These relationships may be accumulated over time to develop a better understanding of the individual, based on multiple data points.

Further, the system may use the relationship-determining modules to identify new relationships and patterns in the data. The system may use these relationships and patterns to create new characteristics, which will be used when evaluating the received data. Likewise, over time the system may identify characteristics that generally do not relate to the data. It may flag these characteristics as irrelevant with respect to certain data or relationships. The system may then skip the irrelevant characteristics, increasing performance.

The system may also use the relationship-determining module to identify characteristics that are related to each other. The system may group these related characteristics together, as a group of characteristics. Any title may be given to this group of characteristics, or to the group of individuals, data, data sources, or metrics that have a strong relationship with that group of characteristics. The system may use the relationship-determining module to determine the relationships between the groups of characteristics and the characteristics, data, individuals, and the other groups of characteristics. In this manner, personality types may be identified and analyzed.

In addition, the system may receive a metric, representing an overall goal or interest of a particular organization. As used herein, the term metric broadly refers to any attribute, measurement, goal, strategy, or other information of interest to an organization. The metric may also consist of a number of sub-metrics. As used herein, the term sub-metric broadly refers to any attribute, measurement, goal, strategy, or other information related to the metric. The system may use a suitable relationship-determining module to identify the relationship between the metric and the characteristics. In this way, the system may further determine the relationship between the metrics and the individuals. The system may also determine the relationship between groups of characteristics and the metric, and individuals and the metric. In this manner, the organization may gain information on how personality types or individuals contribute to the metric it is interested in.

Further, a visualization module may be used to develop a representation of any relationship or group of relationships. The user may select two areas of interest. The selections may comprise one or more metrics, sub-metrics, characteristics, groups of characteristics, individuals, data items, data sources, or any grouping of the same. Once both selections have been made, the system may use the relationships for those selections to calculate an overall relationship between the two. The system may then represent this overall relationship as a single value or descriptor. Further, the user may assign weights to one or more of the selection items, or change the assigned weights. When the weights are changed, the system may re-calculate all relationships and values associated with the weights. The system may use these weights accordingly when calculating the overall relationship between the selections. The system may also determine the relationships between one selection and the underlying items comprising the other selection. The system may then compute a single value or descriptor for the underlying items. In this manner, the user is able to determine how the underlying items contribute to the overall relationship between the selections.

The system may also receive a plurality of threshold criteria. As used herein, the term threshold criteria broadly refers to any value, term, event, or descriptor related to one or more data items, data sources, individuals, characteristics, groups of characteristics, or relationships. The threshold criteria may represent a specific event, (e.g., an individual has changed their job description), a keyword (e.g., an advertising keyword was mentioned in a blog post), a value (e.g., a relationship is at, above, or below the criteria), a transaction (e.g., an individual has booked a flight), or any other criteria about which the organization wishes to be informed. The system may output notifications when any threshold criteria are met.

FIG. 1 is a block diagram of an exemplary embodiment of a characteristic-based server 100. One skilled in the art will appreciate that system 100 may be implemented in a number of different configurations without departing from the scope of the present invention. As shown in FIG. 1, characteristic-based system 100 may include a network interface 102, a memory module 106, a processing module 104, a visualization module 108, and one or more interconnected information storage units, such as, for example, a characteristic storage unit 110, a relationship storage unit 111, a metric storage unit 112, an individual descriptor storage unit 114, a data item storage unit 116, a threshold criteria storage unit 118, a note storage unit 120, and a group storage unit 122. While the information storage units in the embodiment shown in FIG. 1 are interconnected, each information storage unit need not be interconnected. Moreover, rather than separate storage units, characteristic-based server 100 may include only one database that would include the data of storage units 110-122. Likewise, while the data storage units are shown as part of server 100, in another embodiment, one or more storage units may be separate units, connected to server 100 through network interface 102.

Network interface 102 may be one or more devices used to facilitate the transfer of information between server 100 and external components, such as user terminals 140, 142 and data sources 144, 146. Network interface module 102 may receive user requests from local user terminal 140 or remote user terminal 142, and route those requests to processing module 104 or visualization module 108. In exemplary embodiments, network interface module 102 may be a wired or wireless interface to a local-area network connecting one or more local user terminals 142 and local data sources 144, or wide-area network such as the internet, connecting one or more remote user terminals 142, or remote data sources 146. Network interface module 102 may allow a plurality of local user terminals 140 and remote user terminals 142 to connect to the system, in order to make selections and receive information, alerts, and visualizations. Network interface module 102 may also allow the system to connect to one or more local data sources 144, on a local-area-network, or remote data sources 146, on one or more remote networks.

Memory module 106 may represent one or more storage devices that maintain information that is used by processing module 104 and/or other components internal and external to characteristic-based server 100. Further, memory module 106 may include one or more programs that, when executed by processing module 104, perform one or more processes consistent with embodiments of the present invention. Examples of such processes are described below with respect to FIGS. 1-16. Memory module 106 may also include configuration data that may be used by processing module 104 to present user interface screens and visualizations to user terminals 140 and 142. Examples of such screens are described in greater detail with respect to FIGS. 9-16.

Processing module 104, as shown in FIG. 1, may further include a data collection module 130, a grouping module 124, a pattern recognition module 126, and a relationship analysis module 128. Data collection module 130 may include components for collecting data items from data sources, using network interface 102. As described in more detail below, data items collected by the data collection module may include any information pertaining to an individual. Relationship analysis module 128 may include components for determining the existence and strength of a relationship between two items. For example, and as described in greater detail below, relationship analysis module 128 may include a natural-language processing component for determining the relationship between two items. Grouping module 124 may include components for identifying groups of related items. For example, and as described in greater detail below, grouping module 124 may use relationships identified by relationship analysis module 128 to identify groups of related items. Pattern recognition module 126 may include components for identifying patterns in the received data. For example, and as described in greater detail below, pattern recognition module 126 may include pattern recognition algorithms known in the art to identify new characteristics based on patterns of received data.

As shown in FIG. 1, characteristic-based server 100 may also include a plurality of interconnected storage units, 110-122. In this regard, server 100 may include a storage unit module (not shown) having components for controlling access to storage units 110-122. Such a storage unit module may include a query function that, in response to a match request, may query information stored in one or more of storage units 110-122 to identify characteristics, data items, or metrics meeting specified criteria. Storage units 110-122 may be configured using any appropriate type of unit that facilitates the storage of data, as well as the locating, accessing, and retrieving of data stored in the storage units.

Characteristic storage unit 110 may store general characteristics of individuals. As used herein, the term characteristic broadly refers to any attribute, trait, value or other factor associated, whether objectively or subjectively, with an individual or group of individuals. For example, a characteristic may reflect a number of attributes that may be applicable to one or more individuals, such as types of previously or currently held fields of work (e.g., salesperson), professional or personal values (e.g., environmentalism), location (e.g., New York), social interactions (e.g., trendsetter), emotional traits (e.g., generally negative), user-defined characteristics, or others.

Relationship storage unit 111 may store information regarding relationships between one or more characteristics, individuals, groups of characteristics, metrics, data items, or groups thereof. Relationship storage unit 111 may also store values, weights, or other information calculated by processing module 104 or visualization module 108.

Data item storage unit 116 may store data collected by data collection module 130. Data item storage unit 116 may also store metadata associated with the data items, describing the data item. For example, metadata may include the data source the data item was collected from, the time the data item was posted or created, the time the data item was collected, the type of data item (e.g., a blog post), or the individual with which the data is associated. Data item storage unit 116 may also store data items received, or created by characteristic-based server 100.

Metric storage unit 112 may store metrics and sub-metrics for an organization. As used herein, a metric broadly refers to any measurement, criteria, goal, or information of interest to an organization. For example, a given organization may be interested in "brand awareness," or how likely a given person is to recognize the organization's brand. The metric may also be comprised of sub-metrics. As used herein, a sub-metric refers to any information related to a metric. For example, sub-metrics related to brand awareness may include "internet mentions" for that brand, how widely those mentions are distributed, how the mentions describe the brand, number of sales, or others.

Individual descriptor storage unit 114 may store descriptors of specific individuals. As used herein, an individual descriptor includes any information that identifies a specific individual, as opposed to a group of people. Descriptors may include names, addresses, employee numbers, drivers license numbers, credit card and other banking account information, social security numbers, behavioral profiles, relationship or social network information, linguistic styles or writing, voice recognition, image recognition, or any other unique identifiers. In this manner, each descriptor or group of descriptors may be used to identify a unique individual.

Threshold criteria storage unit 118 may store the threshold criteria used to determine when a notification may occur. Threshold criteria may include any value, term, event, or descriptor related to one or more data items, data sources, individuals, characteristics, groups of characteristics, or relationships. The threshold criteria may represent a specific event, (e.g., an individual has changed their job description), a keyword (e.g., an advertising keyword was mentioned in a blog post), a value (e.g., a relationship is at, above, or below the criteria), a transaction (e.g., an individual has booked a flight), or any other criteria about which the organization wishes to be informed.

Note storage unit 120 may store notes, consisting of information entered by one or more users, that are associated with one or more individual descriptors, groups, relationships, metrics, sub-metrics, data items, or data sources. The information may include textual, graphical, audio, or video information. For example, a user may enter a description of a specific group, as the "treehugger" group. This description may allow users to more easily refer to, and understand the characteristics that comprise that group.

Group storage unit 122 may store groups, consisting of a plurality of characteristics, or other groups. These groups may allow users to more easily identify and understand categories of individuals.

Visualization module 108, as shown in FIG. 1, may further include a selection module 132 and a calculation module 134. Selection module 132 may include components for receiving user selections from network interface module 102. For example, selection module 132 may allow users on remote terminals to make selections. User selections may consist of one or more individual descriptors, metrics, sub-metrics, characteristics, groups, data items, data sources, or groups thereof. Calculation module 134 may include components for determining the relationships between the selected groups and the remaining groups, data items, metrics, sub-metrics, characteristics, data sources, and individuals. This may include using the relationships to calculate an overall relationship for a group with respect to the other groups, data items, metrics, characteristics, data sources, and individuals. Calculation module 134 may also receive weights associated with a group, data item, metric, sub-metric, characteristic, data source, or individual, and use the weights in conjunction with the stored relationships when determining the overall relationship for a selection. Visualization module 108 may use the calculated values for a selection to build a screen containing at least one selection, and a representation of the overall relationship between that selection and at least one other selection. Visualization module 108 may also include additional information about the selection in the screen. For example, and as discussed in more detail below, selection module 132 may receive a selection of an individual and a selection of a metric. Calculation module 134 may determine the overall relationship between the individual and metric based on the stored relationships. Visualization module 108 may return a screen containing information about the individual and a single descriptor of the overall relationship.

Characteristic server 100 may consist of a single computer or mainframe, containing at least a processor, memory, storage, and a network interface. Server 100 may optionally be implemented as a combination of instructions stored in software, executable to perform the steps described below, and a processor connected to the software, capable of executing the instructions. Alternatively, server 100 may be implemented in a number of different computers, connected to each other either through a local-area network (LAN) or wide-area network (WAN). Data collection module 130 may optionally comprise search engine tools known in the art, operable to find data sources and data items relevant to the search criteria, such as an individual. Storage units 110-122 may comprise any computer-readable medium known in the art, including databases, file systems, or remote servers.

Figure 2:
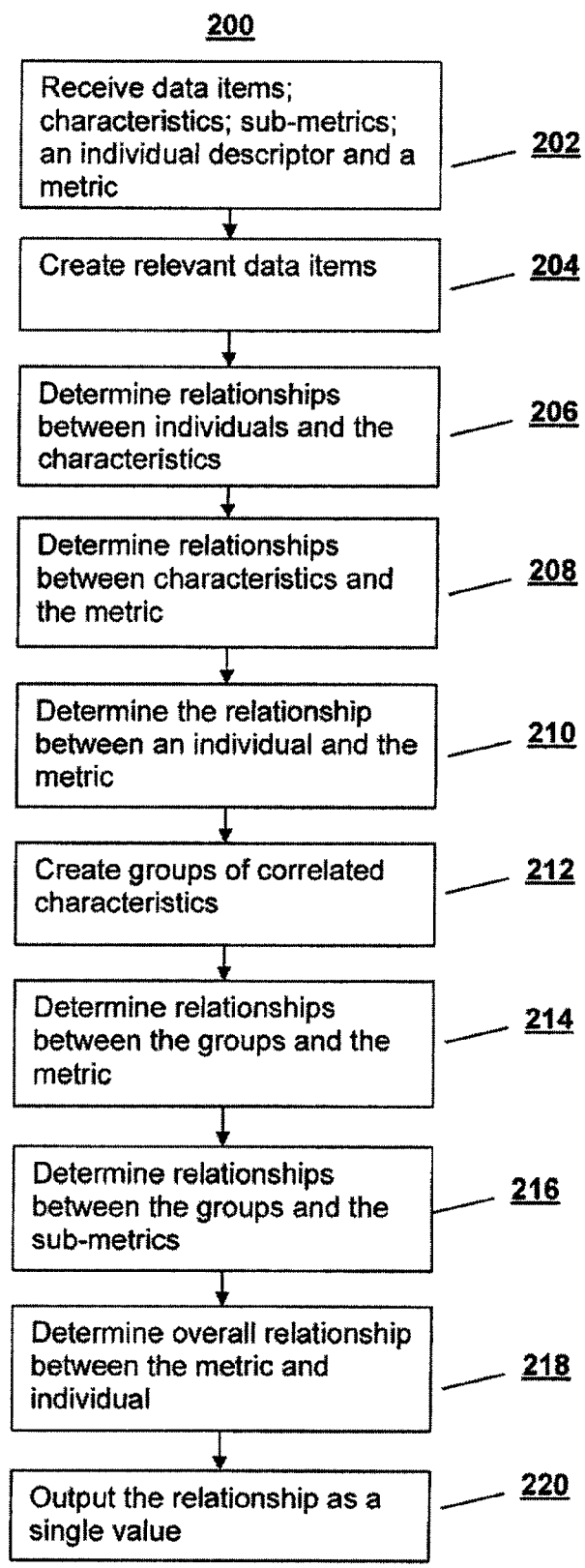
FIG. 2 is a flowchart depicting one process for determining a relationship score for an individual relative to a metric.

FIG. 2 is a flowchart demonstrating an exemplary process for characteristic-based profiling consistent with the present invention. For example, characteristic-based system 100 may use the process of FIG. 2 to determine the relationship between an individual, or groups of individual descriptors, and a user-specified metric based on a number of characteristics. As shown in FIG. 2, the process may begin by receiving a number of characteristics, an individual descriptor, and a metric. A metric broadly refers to any measurement, goal, interest, parameter, or other information that an organization may be interested in learning.

In one embodiment, the metric will be an overall goal or measurement related to a business. In this embodiment, the system uses the data and characteristics to obtain information about existing and potential customers that are positively and negatively related to the metric. However, the system may also be used to identify other factors related to the metric, such as characteristics, groups of characteristics, data sources, or sub-metrics. By recognizing new characteristics as data is processed, the system may also identify new, previously unknown, customers or groups of customers related to the metric. For example, the system may use a pattern recognition module 126, described above, to determine patterns of data that are not defined as characteristics, but which occur on a regular basis. Once recognized, the system may automatically define these patterns as new characteristics.

As discussed above, characteristics broadly refer to any attribute, trait, value, or other factor associated, whether objectively or subjectively, with an individual or group of individuals. For example, characteristic types may comprise: social network (influencer, follower, etc.); sentimental (positive, neutral, etc.); temperamental (emotionless, dramatic, etc.); attitudinal (health conscious, eco-friendly, etc.); psychographic (personality factors, personality-derived factors, etc.); demographic (age, gender, etc.); transactional (past purchases, rewards, etc.); firmographic (employment, rank, etc.); data item attributes (data source; author, etc.), cognitive dimensions of thinking (i.e., evaluative, schedule-driven, etc.), or other descriptions of groups or categories of people. A characteristic may be an objective factor, such as age or income, a subjective factor, such as "eco-friendly," or a combination of objective and subjective factors. These characteristics are typically selected by a user, based on known templates, or on the types of individuals they believe will be relevant to one or more metrics or sub-metrics. Alternatively, or in addition, and as described in more detail below, the system itself may identify characteristics that are relevant to the metric as it analyzes the data items. These characteristics may also be obtained or purchased from other data sources, such as marketing databases, or public websites, discussion boards, or databases.

Individual descriptors broadly refer to any information that may be used to identify a specific individual, including account information, license numbers, phone numbers, email addresses, name, relationship information, behavioral profile, nicknames or aliases, or any information that may be used to differentiate one individual from a group. These descriptors may be received from organizations, users, or internal or external data sources, as described below. Further, an individual descriptor may contain multiple pieces of information that collectively identify a specific person. For example, an individual descriptor may consist of a name, driver's license number, credit card account number, and street address, which may be used collectively to identify a specific person. This example is not limiting, and any information that uniquely identifies an individual may be part of an individual descriptor. For another example, an individual descriptor may consist only of social network information, which describes a person by their social or business relationships to others.

At step 202, the system may receive a plurality of data items, characteristics, sub-metrics, an individual descriptor, and a metric. The data items may be received from a plurality of data sources. At step 204, the system may create relevant data items for the individual. In one embodiment, the system accesses all data sources that may have relevant information about the metric. These data sources may comprise; internal data sources (e.g. crm, payroll, etc.), privately-shared sources (e.g., suppliers, partners, etc.), user-authorized data sources (e.g., social media accounts, etc.), public data sources (e.g., blogs, tweets, etc.), or purchased data sources (e.g., data aggregators, credit card db, etc.). As discussed above, the purchased data sources may also contain characteristics, metrics, or individual descriptors. In another embodiment, the system may only access data from sources that have been marked as relevant for one or more individual descriptors, metrics, groups, or sub-metrics.

In general, data sources may contain both structured, and unstructured data, which may be qualitative and subjective, quantitative and objective, or a combination of both. Structured data broadly refers to any data that is placed into a pre-existing structure such as a database, spreadsheet, or form. Unstructured data broadly refers to data that does not have a defined structure, such as prose, news articles, blog posts, comments, messages, emoticons, images, video, audio, or other freely-entered data. Quantitative and objective data broadly concerns factual, measurable subjects. For example, quantitative data may be described in terms of quantity, such as a numerical value or range. In comparison, qualitative and subjective data broadly describes items in terms of a quality or categorization wherein the quality or category may not be fully defined. For example, qualitative and subjective data may describe objects in terms of warmth and flavor.

The system may use an appropriate relationship-determination module, utilizing techniques known in the art, to determine the strength of the relationship between the data items and the individuals. This relationship strength consists of a number or descriptor indicating the magnitude of the relationship. The strength of the relationship represents how strongly the data item is related to a specific individual descriptor. For example, a data item discussing the name, address, and family members of the individual would have a strong relationship to an individual descriptor containing the same information. Likewise, a data item that did not mention any of the information comprising the individual descriptor would not have a strong relationship to that descriptor. In this manner, the system may determine which individuals are associated with the data item. The system may also use other methods to identify the individual associated with, or likely to be associated with a data item. For example, the data item may be associated with a known individual descriptor, such as a username, account, or name.

These data items will be strongly correlated with any individual descriptor containing a matching user name, account, or name. In another embodiment, the system may determine when the data item refers to a pseudonym, or includes missing information about an individual. For example, when a data item strongly relates to a known descriptor, but the names do not match, the system may use additional methods to determine whether the two individuals are the same. In such a case, the system may create a pseudonym object, containing a descriptor of the individual associated with the data item. If additional data items are also found to have a strong relationship to both the individual descriptor and the pseudonym, the system may add the information from the pseudonym to the individual descriptor. In this manner, future data items relating to the pseudonym may be identified with the individual. If no strong relationship is found, the system may use the pseudonym to create a new individual descriptor.

The system may automatically use the pseudonym to create a new individual descriptor, or add the pseudonym information to an existing individual descriptor, if threshold relationship strengths are met. For example, if the relationship strength between the pseudonym and the descriptor reaches a set value, the system may automatically merge the two. Likewise, if the relationship strength falls below a certain threshold, the system may automatically create a new descriptor based on the pseudonym. This behavior is not limited to names, and the system may perform this action when any of the information in the individual descriptor does not match the information in the data item. In this manner, the system is capable of collecting new information about the individuals, as well as recognizing new individuals.

If a strong relationship exists between the data item and an individual descriptor, the system creates an association between the data item and the individual descriptor. The system will also mark the data source as relevant to the individual descriptor, so that it may be identified more quickly in the future. The system will next use an appropriate method known in the art, such as, for example, natural language processing, to identify the portions of the data item that are relevant to the individual. The system uses the relevant data portions to create a new data item, containing only the data relevant to one or more individual descriptors.

At step 206, the system uses a suitable relationship-determining module to determine the relationship between the individual descriptors and the characteristics. The relationship-determining module may comprise algorithms known in the art, including one or more of; natural language processing, textual analysis, contextual analysis, direct 1-to-1 mapping, artificial intelligence, image analysis, speech analysis, or other suitable techniques known for determining correlations, patterns, or relationships. The relationship consists of a magnitude, indicating the strength (or lack thereof) of the relationship, and a direction, indicating whether the relationship is positive, negative, or neutral. As used in this application, the direction simply indicates whether a given relationship represents a positive correlation (i.e. positive direction), a negative correlation (i.e., negative direction), or no correlation (i.e. neutral direction). For example, an individual who has repeatedly shown "eco-friendly" behavior and attitudes will be positively correlated with an "eco-friendly" characteristic. In this case, the characteristic and individual descriptor would have a strong, positive relationship. Similarly, an individual who displays hostility towards "eco-friendly" topics and ideas would be negatively correlated with the "eco-friendly" characteristic. The individual descriptor for this person would have a strong negative relationship with the "eco-friendly" characteristic. Finally, an individual who did not correlate to the "eco-friendly" characteristic would have a neutral relationship with it.

Figure 3:
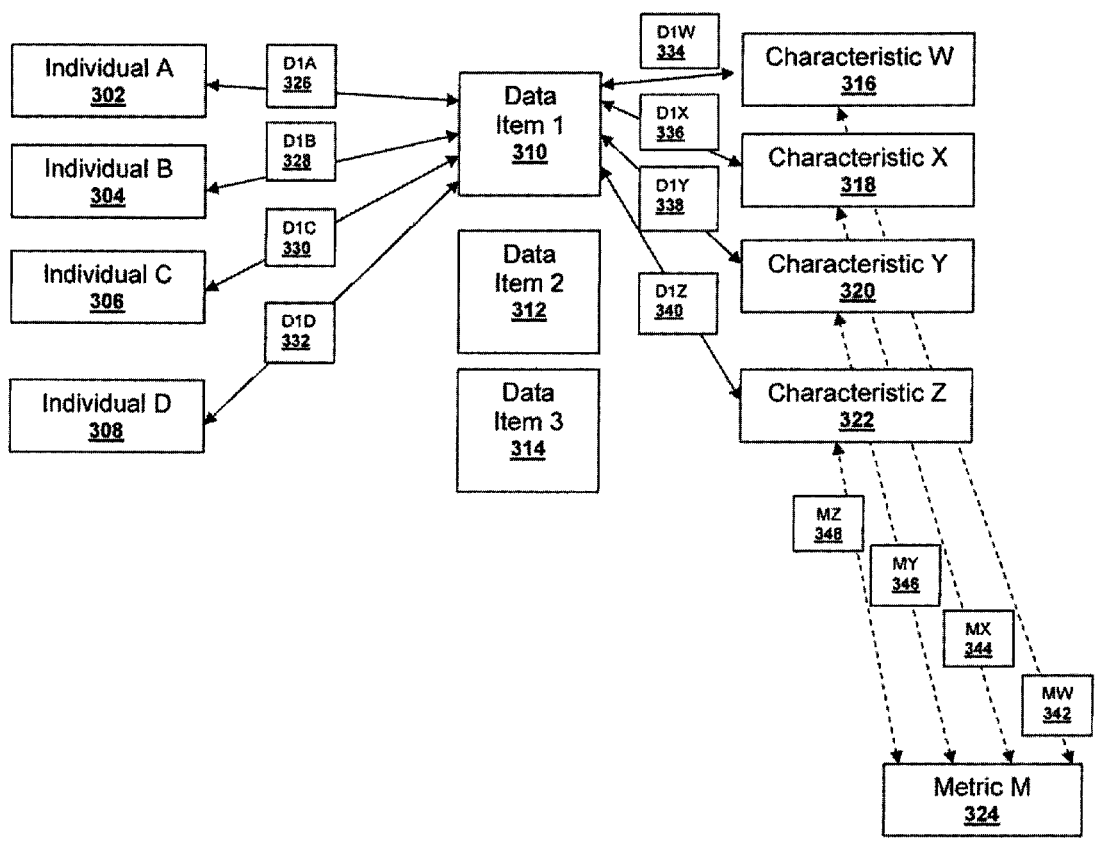
FIG. 3 is a block diagram depicting an example of relationships between characteristics, metrics, data items, and individuals.

To determine this relationship, the system may use a relationship-determining technique known in the art to determine the relationship between the data items and the characteristics. This relationship may consist of a magnitude and a direction. The system may also calculate a value for a characteristic based on the relationship between the characteristic and the data item, and the relationship between the data item and the individual descriptor. This is represented in FIG. 3, items 326-340. For example, the relationship between individual A 302 and characteristic W 316 will be determined based on relationship D1W 334 and D1A 326; where relationship D1W 334 represents the relationship between characteristic W and data item 1 310, and relationship D1A represents the relationship between data item 1 and individual A. The combined relationships will be stored with the characteristics, and associated with the individual descriptor as shown in FIG. 4. The combined scores based on D1A, D1W, 402 to D1A, D1Z 408 are associated with the relationship between individual A 302, and characteristics W 316 to Z 322.

At step 208, The system may also determine the relationship between the characteristics and the metric. This relationship may also consist of a magnitude and direction, as described above. The system may determine this relationship using a suitable relationship-determining module, known in the art. FIG. 5 illustrates an example of the relationships determined between characteristics W 316 to Z 322, and metric M 324, represented by MW 342 to MZ 348 respectively.

At step 210, the system may determine the relationship between individual descriptor 302 and metric 324. The system may determine this relationship using a suitable relationship-determining module, as described above. This relationship may also consist of a magnitude and direction, as described above. As shown in FIG. 5, this relationship may be determined based on the relationships between characteristics 316-322 and metric 324, represented by MW 342 to MZ 348, and the relationships between the individual 302 and characteristics 316 to 322, represented as D1A, D1W 402 to D1A, D1Z 408.

At this point, the system may output individual-metric relationship 500, representing the strength of the relationship between individual 302 and metric 324. This score may be represented as a numerical value, a descriptor, an image, or any other means of conveying the overall magnitude and/or direction of the relationship between individual 302 and metric 324.

In another embodiment, the system may identify groups of characteristics, in order to determine the relationship between the groups and the metric. In this embodiment, the system may also use a suitable relationship-determining module, as described above, to determine the relationships between the characteristics. At step 212, the system may identify groups of characteristics that have strong relationships to each other using grouping module 124. As shown in FIG. 6, characteristics W 316, X 318, and Z 322 are strongly related, and the system may group them into group 1 600. Because characteristic Y 320 is not strongly related to the others, the system may not include it in group 1 600.

Figure 7:
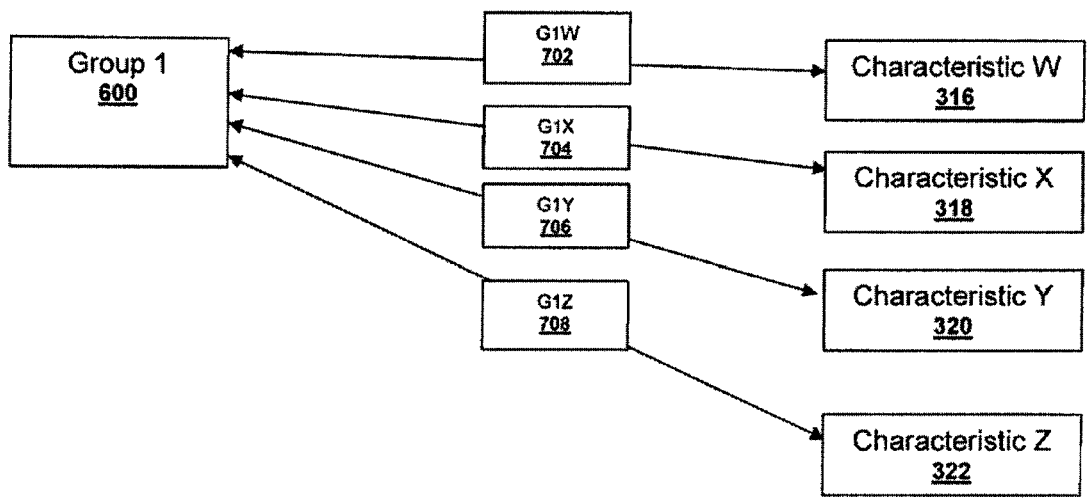
FIG. 7 is a block diagram depicting an example of relationships between groups and characteristics.
Figure 8:
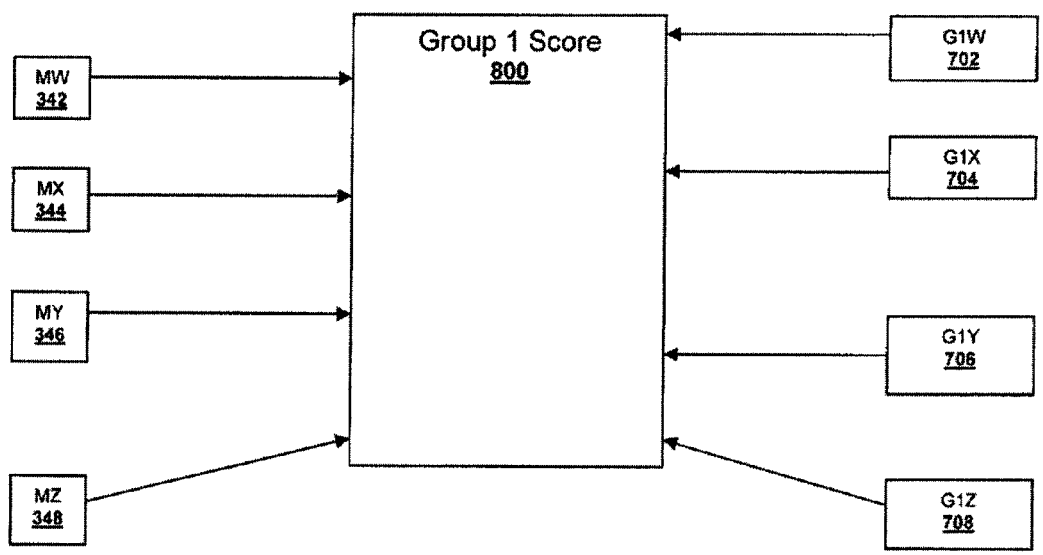
FIG. 8 is a block diagram depicting an exemplary score for a group.

At step 214, the system may also determine the relationship between the groups and the metric, based on the underlying characteristics. For example, the system may use a suitable relationship-determining module, as described above, to determine the relationships between the groups and the characteristics. For example, as shown in FIG. 7, the system determines relationships G1W 722 to G1Z 728 based on the relationship between group 1 800 and characteristics W 316 to Z 322. As described above, the relationship may contain a magnitude and direction. As shown in FIG. 8, the system may determine the group-metric relationship 800 between group 1 600 and metric 324 based on the relationship values MW 342 to MZ 348 and relationship values G1W 722 to G1Z 728. As described above, the system may output group-metric relationship 800, which may be represented as a numerical value, a descriptor, an image, or any other means of conveying the magnitude and/or direction of the relationship.

Figure 9:
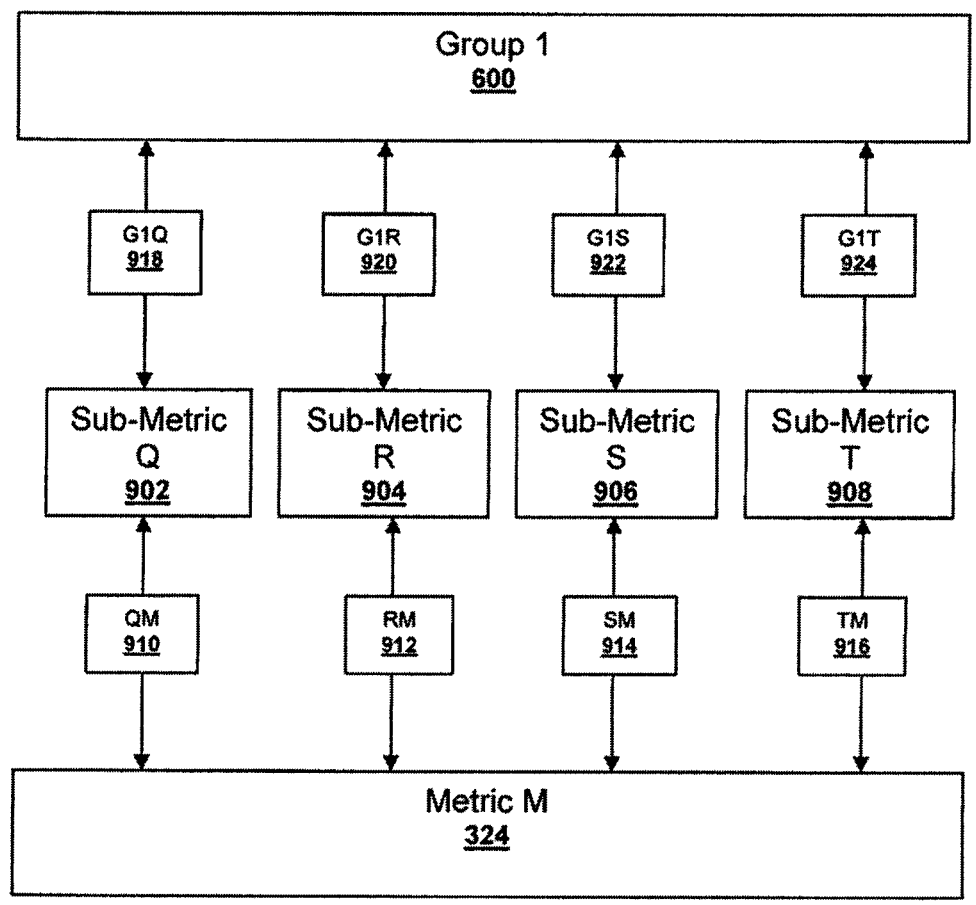
FIG. 9 is a block diagram depicting relationships used to determine sub-metric scores.

In yet another embodiment, the system may also determine the relationship between the sub-metrics and the metric. For example, at step 216, the system may also use a suitable relationship-determining module, as described above, to determine the relationships between the groups of characteristics and the sub-metrics. For example, as shown in FIG. 9, the system may determine metric-sub-metric values QM 810 to TM 916 based on the relationship between metric M 324 and sub-metrics Q 902 through T 908. The system may also determine group-sub-metric values G1Q 918 through G1T 924, based on the relationships between group 1 600 and sub-metrics Q 902 through T 908. As described above, the relationship may contain a magnitude and direction. The system may also determine the overall relationship score for the sub-metrics, based on the group-sub-metric values and metric-sub-metric values. For example, the system may determine an overall relationship for sub-metric Q 902 to metric M 324 based on G1Q 918 and QM 910. The system may output this information, as described above. In this manner, the system may determine which of the sub-metrics have the strongest relationship to the overall metric M 324.

Figure 10:
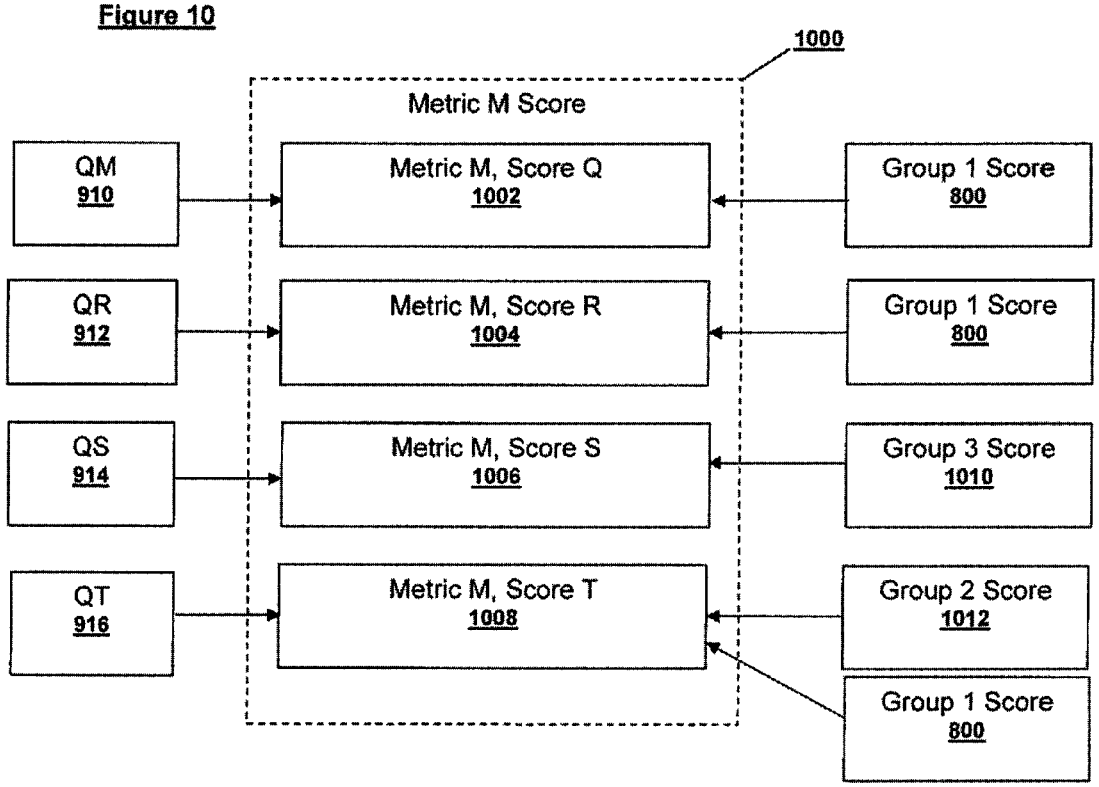
FIG. 10 is a block diagram, depicting relationships used to determine scores for a metric.

At step 218, the system may also determine an overall score for a metric, representing how successful the company is in meeting its metric, based on the collected data. For example, FIG. 10 shows an example of overall metric score 1000, based on a plurality of metric sub-scores, 1002-1008. The metric sub-scores are determined based on the metric-sub-metric values 910-918, as well as the group scores 800, 1010, 1012 for one or more groups having strong relationships to the sub-metrics. The system may determine score 1000 for the metric based on one or more of the sub-scores 1002-1008. As described above, the system may output this score using a suitable descriptor or value, at step 220.

Figure 11:
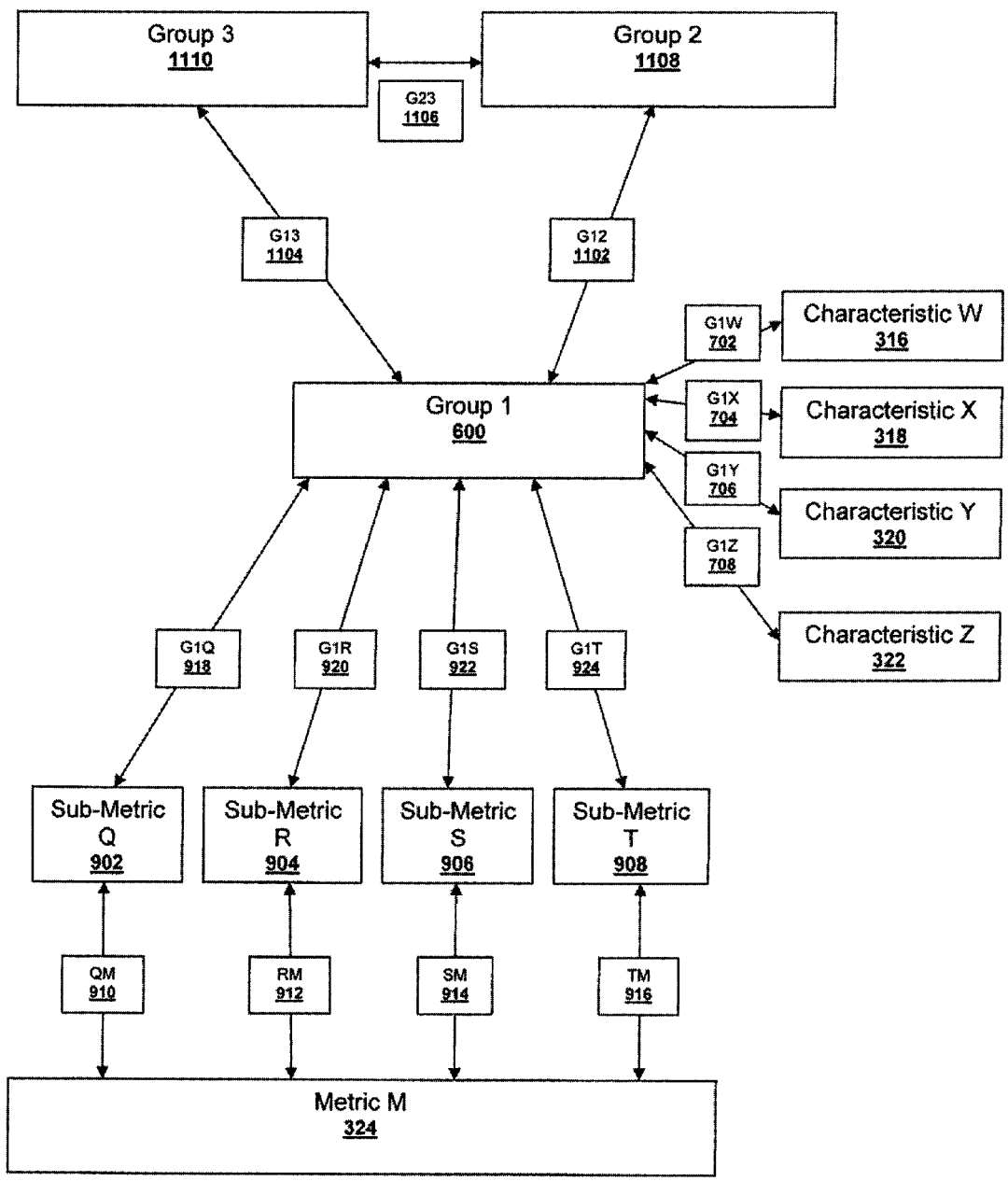
FIG. 11 is a block diagram, depicting relationships between groups, characteristics, sub-metrics, and a metric.

FIG. 11 shows another example of the relationships between groups, characteristics, sub-metrics, and the metric. In one embodiment, the system may use a suitable relationship-determining module, as described above, to determine the relationship between groups, represented as G12 1102, G13 1104, and G23 1106. The system may identify groups of characteristics that have strong relationships to each other using grouping module 124. In this manner, the system may also create larger groups, in the event that less granularity is desired.

It should be apparent from the above description that a similar process may be performed starting with any metric, sub-metric, or characteristic. For example, the system may perform a similar process to calculate an individual score for a sub-metric with regard to a metric. It should also be apparent that the steps may be performed in any order, and that some steps may be omitted. It will also be apparent to a person having skill in the art that although the example discussed concerns business metrics and customers, the system may be broadly used for other applications as well. For example, an organization may have specific criteria for suitable participants in a clinical trial. In this embodiment, the metric would represent the criteria necessary to be a suitable participant, and the system would allow the organization to identify individuals who had a strong relation to the criteria. Likewise, a metric may be an organization's performance goals for its employees, allowing the system to identify the individual employees with the strongest relationship to those performance goals.

In another aspect of the system, a map of relevant data may be built from internal data, in order to identify relevant characteristics and data sources. For example, an organization may already possess information about its customers or relevant individuals. The system may analyze this data, using the steps described above. The system may use pattern recognition module 126 to identify relevant characteristics. Once the internal data has been processed, the system may use these characteristics when analyzing data from external data sources. This may save time and increase performance, since the system will use fewer irrelevant characteristics when analyzing the new data. Additionally, in this manner, the system may use information describing individuals it is interested in, without revealing any of the individuals' descriptors. This is because only characteristics, groups, or other mapped data is used when accessing external data sources.

Figure 12:
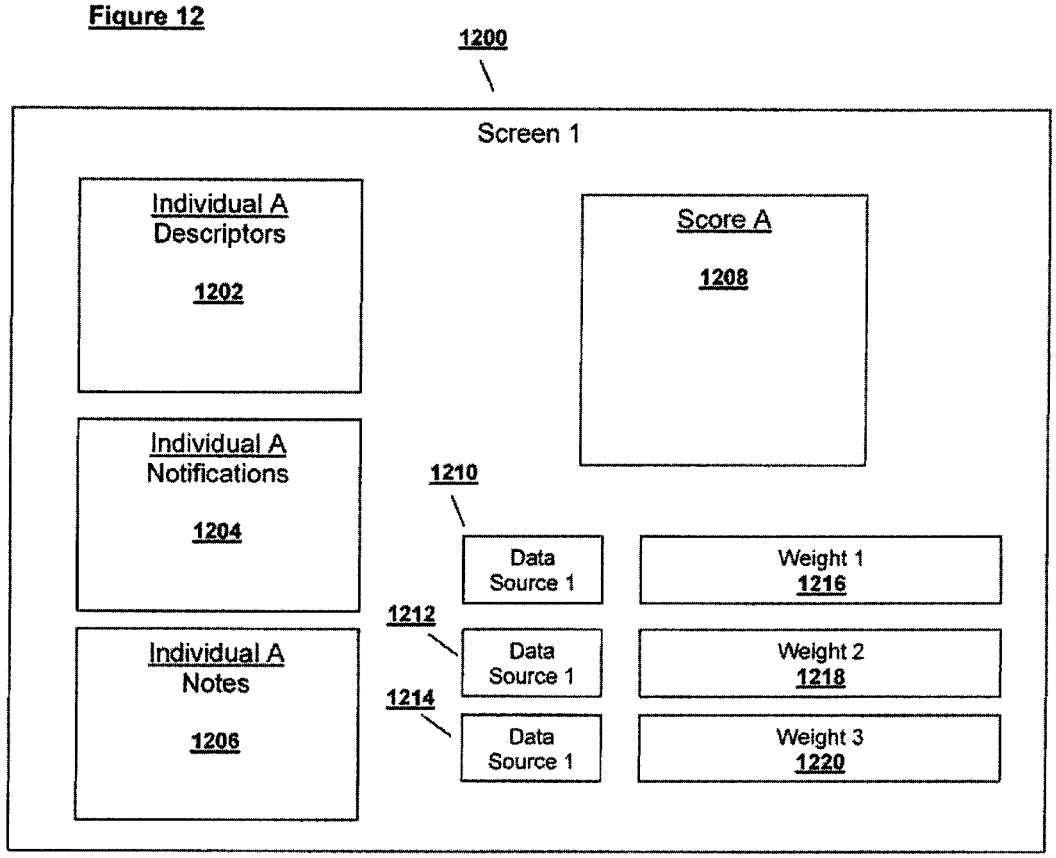
FIG. 12 is a block diagram depicting a sample user screen displaying an individual and their score.

FIG. 12 shows an exemplary embodiment of a visualization screen for an individual. Screen 1200 may comprise an individual descriptor window 1202, a notification window 1204, a note window 1206, a score window 1208, and one or more data source identifiers 1210-1214 and weight selection windows 1216-1220. Individual descriptor window 1202 may contain information describing an individual, based on the individual descriptor for that individual. Notification window 1204 may display any notifications related to the individual. Note window 1206 may display notes related to an individual. Note window 1206 may also allow remote users to enter notes, which will be stored and associated with the individual's descriptor. Thus, the notes related to an individual may be entered by a user, and associated with that user, or available to all users. Score window 1208 may contain the overall score for the user, relative to a metric, as computed above. Source identifiers 1210-1214 may contain icons, text, or other indicators of data sources that have strong relationships to the individual, as determined above. Weight selection windows 1216-1220 allow remote users to view the current weights assigned to the data sources. Weight selection windows 1216-1220 may also allow remote users to enter new weights for the data sources, causing visualization module 108 to re-calculate relationships and scores as described above. Thus, screen 1200 allows users at remote terminals to view information related to individuals, such as the individual's descriptor, notes, notifications, and score. One or more of these components may be missing, or present in a different quantity, or different positions than shown.

Figure 13:
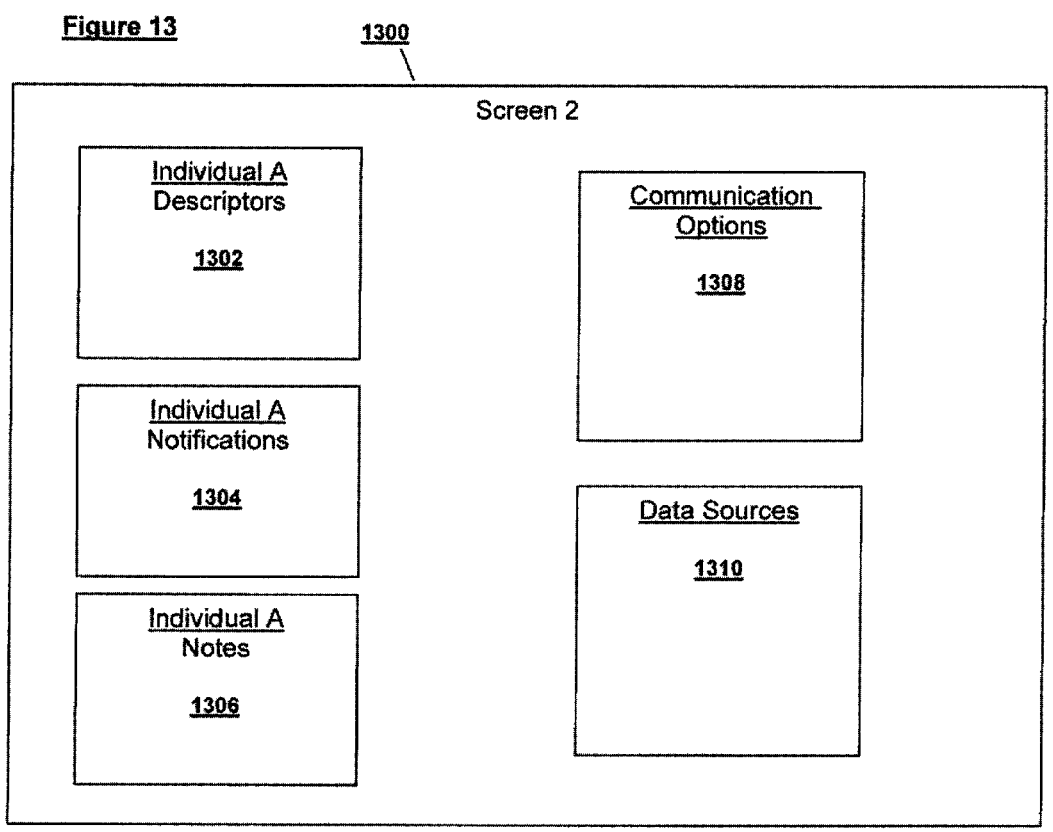
FIG. 13 is a block diagram depicting a sample detail screen for an individual.

FIG. 13 shows an alternative embodiment of a screen related to an individual. Screen 1300 may comprise an individual descriptor window 1302, notifications window 1304, note window 1306, communication options window 1308, and data sources window 1310. Communication options window may contain one more representations of the preferred communications methods for the individual. Preferred communications methods may be determined by frequency of use, stated preferences, or weights assigned by a user. The preferred communications window may also allow a remote user to select a particular one of the preferred communication methods, in order to send a message to the individual. Upon selection, the system may present the user with a communication screen, allowing the user to enter a message, or otherwise communicate with the individual. One or more of these components may be missing, duplicated, or in different positions than shown.

Figure 14:
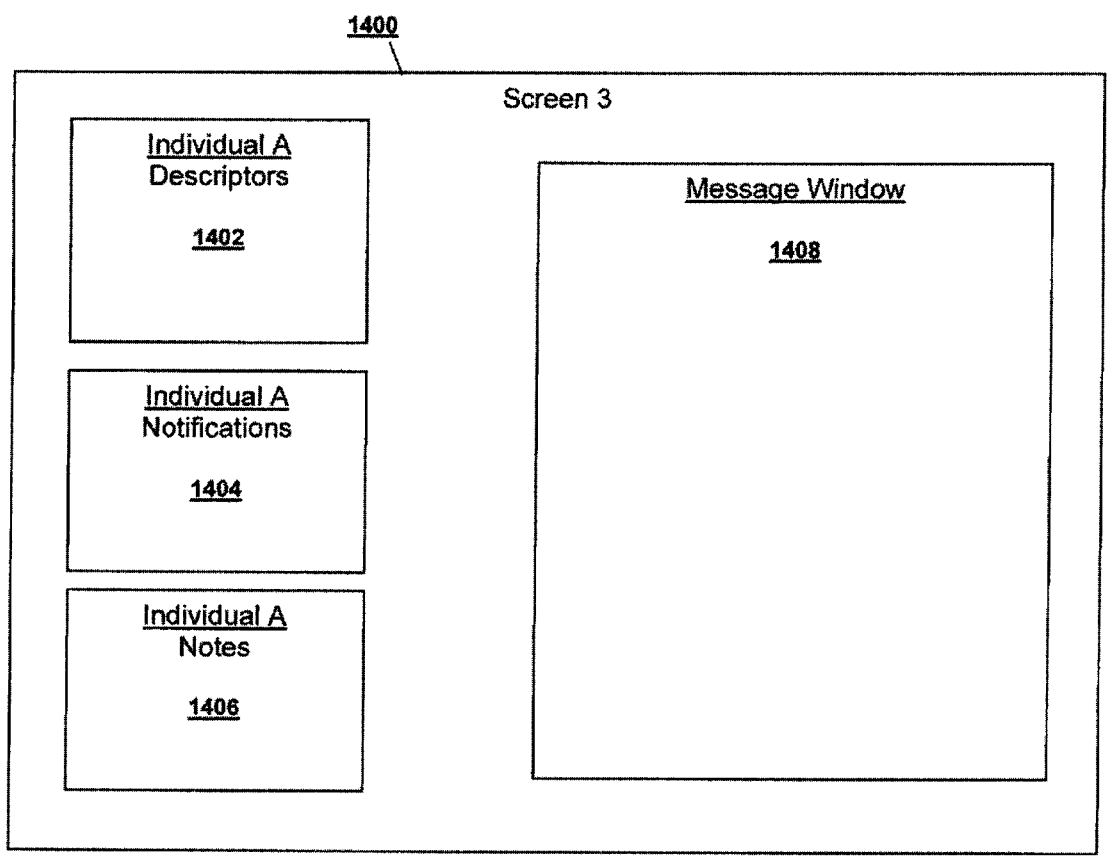
FIG. 14 is a block diagram depicting a sample communication screen for an individual.

FIG. 14 shows exemplary communication screen 1400, allowing a remote user to send a message to the individual. Screen 1400 may comprise an individual descriptor window 1402, notifications window 1404, note window 1406, and message window 1408. Screen 1400 may permit the remote user to enter a message into the message window, or otherwise communicate with the individual. The system may send the message to the individual, using the selected communication medium, such as email, text message, voice message, video, or other communication methods. Alternatively, the system may use existing communication methods such as voice chat, video chat, instant messaging, or phone to permit the user to communicate interactively with the individual. One or more of these components may be missing, duplicated, or in different positions than shown.

Figure 15:
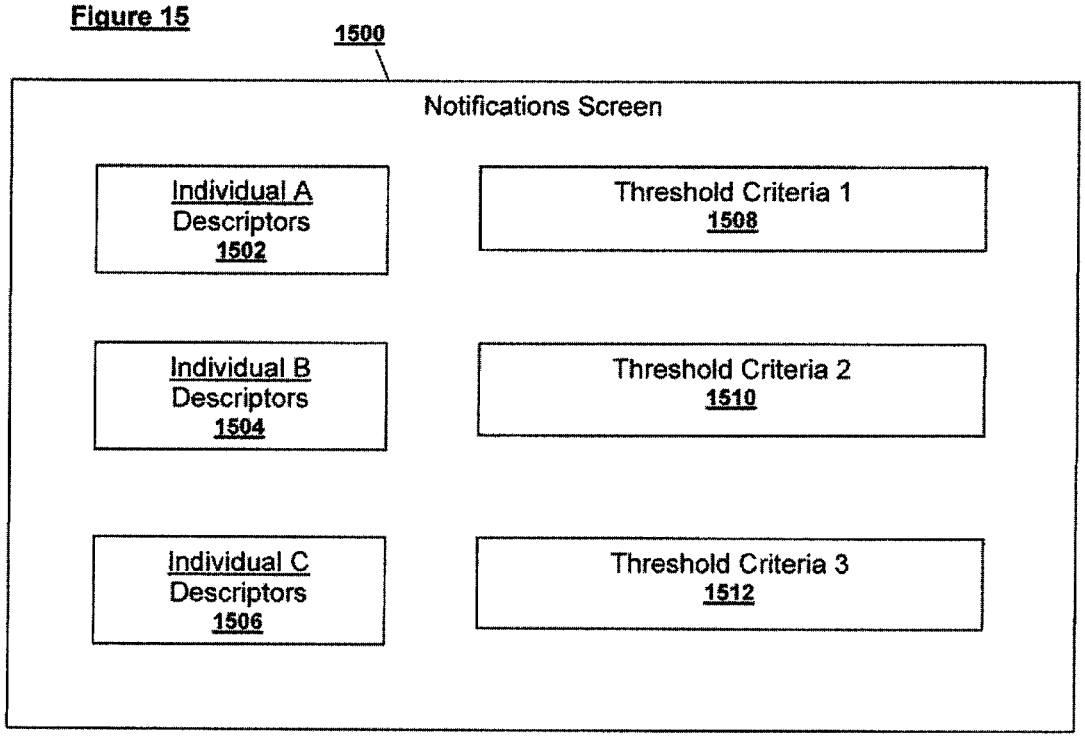
FIG. 15 is a block diagram depicting an example of a general notification screen.

FIG. 15 shows exemplary notification screen 1500, allowing a remote user to view notifications related to multiple individuals. The screen may comprise multiple individual descriptor windows 1502-1506, and one or more threshold criteria windows 1508-1512. Threshold criteria windows 1508-1512 may describe the criteria or event that caused the notifications to be sent. Alternatively or additionally, the threshold criteria windows 1508-1512 may also display one or more data items related to the notification. One or more of these components may be missing, duplicated, or in different positions than shown.

Figure 16:
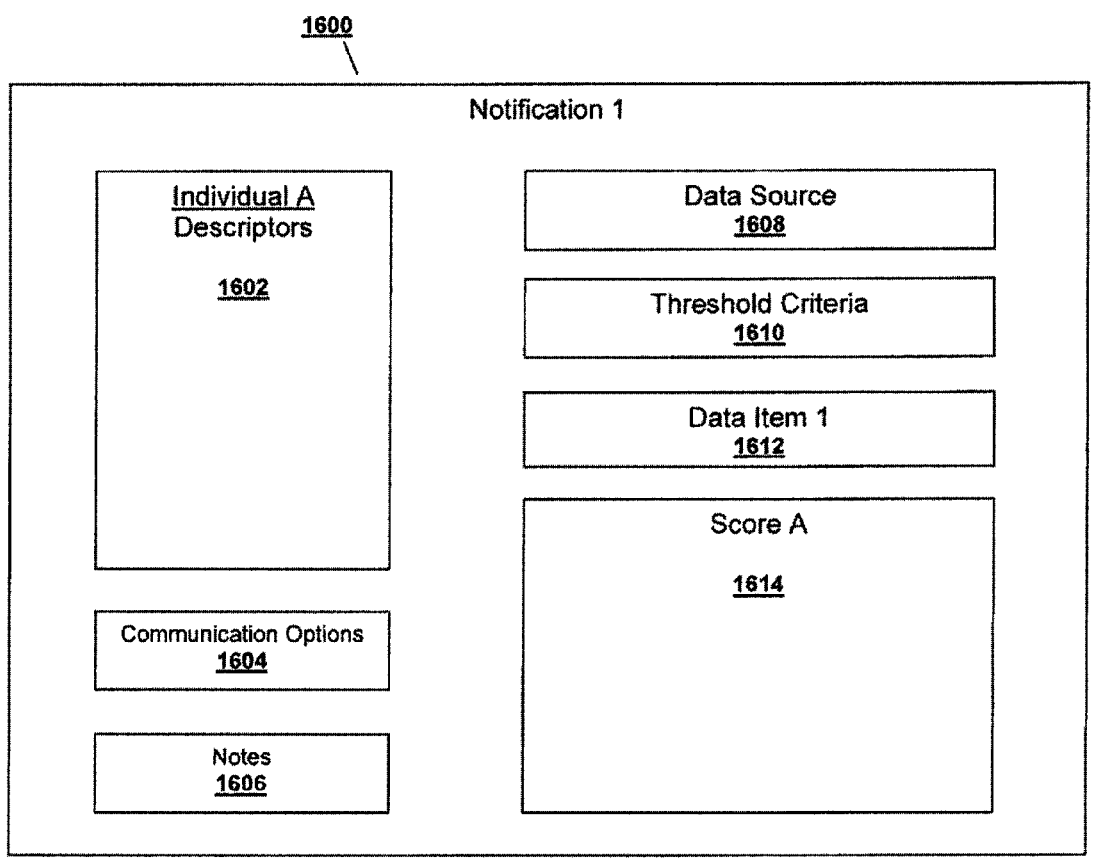
FIG. 16 is a block diagram depicting an example of a specific notification screen for an individual.

FIG. 16 shows exemplary notification screen 1600 for a single individual. The screen may comprise individual descriptor window 1602, communication options window 1604, note window 1606, data source window 1608, threshold criteria window 1610, data item window 1612, and score window 1614. One or more of these components may be missing, duplicated, or in different positions than shown.

As described above, systems and methods consistent with the invention provide a characteristic-based system that allows an organization to identify, organize, describe, and visualize the relationships between individual descriptors, characteristics, and metrics. As further described below, these relationships, and the information derived from them, may be used for additional purposes, other than identifying the items that are most relevant to a given organization.

In one application, the above system, apparatus, and methods may be used to tailor a businesses' message to one or more individuals, such as existing or potential customers, investors, employees, and others. In one embodiment, the business may wish to send a message only to individuals that have a strong relationship to a certain characteristic or group of characteristics. For example, a business that is starting a new advertising campaign may wish to send an advertisement, along with a free trial of a product to individuals that are the most likely to help spread the campaign. In this case, the business may identify a group of characteristics as the "viral" group. This group may include, for example characteristics associated with an individual's reach (e.g., the number of followers or fans that individual has online, how dense their social network is, etc.), the strength of the individual's connections (e.g., how many people read that individual's messages, how many people forward, post, or discuss those messages, etc.), the impact an individual has on others (e.g., how many people act after reading the individual's messages, how many people stop following an individual after reading their messages, how many people ask questions based on the messages, etc.), and the extent the individual engages in cross-platform posting (i.e., receiving information through one platform or medium, and posting it on a different platform). The business may measure the relationships for this group using the method, system, and apparatus described above. Information regarding these relationships may then be used to identify individuals that have a strong relationship to the desired characteristics, and are therefore likely to spread the communication to a wider audience.

The business may also identify other relationship information regarding these individuals. For example, the business may identify which individuals have a strong relationship to certain products, companies, industries, or other subject matter. In this manner, the business can identify which individuals will be the most likely to spread a message to others, and also interested in the specific subject matter related to the message. This also allows the business to identify individuals that may be critical of the message, in order to avoid sending it to them. Alternatively, a business may wish to target these individuals, in an attempt to change their mind. Likewise, using system, apparatus and methods described above, a business may be able to identify new subject matter that would be likely to spread quickly. This may allow the business to tailor the subject of its message, or identify new opportunities.

In a second application, this system, apparatus, and method may allow organizations to determine the characteristics of multiple individuals, and how they relate to the concerns of that organization. For example, using the disclosed method, system, or apparatus, a sports franchise can identify what type of people, based on their respective characteristics, are sitting in which section of the stadium. It may be that fathers and sons often sit in higher sections where there is substantial turnover in ticket ownership or reselling. Based on this information, an advertisement banner in these sections may become substantially more valuable because the franchise knows that certain companies want to advertise to children, especially those whose fathers enjoy buying them gifts and taking them to football games. Or, the franchise may move an ice cream vendor closer to that section rather than a beer vendor. Additionally, the sport's franchise may use the information gathered about each attendee to send personalized advertisements through email, SMS, MMS, or WiFi to both the child's phone and the Father's phone during a timeout. Using the disclosed system, apparatus and methods, the franchise may identify that the father's cognitive dimension of thinking is "Ambition". Therefore, the franchise may send a video to the father showing how the most successful people in his industry, as well as potential business partners, purchase club-level season tickets. In contrast, the son may receive a video clip of the team's best player making an incredible play, followed by a limited time offer to purchase that player's jersey. In this manner, information regarding the relationships determined above may be used to adjust the services and advertisements that an organization offers its patrons, in real time.

A third application relates to customer rewards or appreciation programs. For example, an organization may use the system, method, and apparatus described above to tailor its miles/rewards program to suit the needs of each respective customer, as most profitable. For example, Sally and Jake may both be platinum-level travelers with a given airline. Yet, Jake may be a father who likes to travel with his children. Thus, Jake may prefer discounted tickets, "child-friendly" security screening lines, and free in-flight entertainment and child-friendly snacks. Sally, however, may be a business traveler with a busy schedule. She may prefer curb-side check-in, free upgrades, expedited boarding, free in-flight WiFi, and room to hang her carry-on garment bag. The airline may use the disclosed system, methods, and apparatus to identify the characteristics of each traveler, and offer each the benefits that will be the most valuable to that individual.

A fourth application relates to recommendation systems. An organization (for example, a retailer, product review website, or salesman) may use the characteristic-based profiling system to recommend or promote products that other individuals with similar characteristic-based profiles purchased. Product recommender systems may recommend additional products to consumers based on how often one product is viewed, purchased, or queried in conjunction with the product that the consumer has already decided to purchase. In this respect, these systems are product focused. In contrast, recommendations based on the claimed system, apparatus, and methods described above may look at which products were purchased by similar individuals. For example, a car dealership may identify that a potential customer is a lawyer, has 3 children, is "neurotic" according to the "Big 5" personality traits, and has large and frequent variations in temperament. Recommender systems not based on the customer's characteristics would consider what car the potential customer has first asked to test-drive. Based on that request, the salesperson may recommend additional cars that are similar to the car first tested. In contrast, a recommender system using the system, method, and apparatus described above may allow the salesperson to see what cars other lawyers, with multiple children, who are neurotic with frequent swings in temperament purchased, and recommend those cars. Thus, the salesperson may suggest a super-charged SUV with a DVD player, even though the potential customer originally requested a hybrid sedan with minimal features.

A fifth application relates to the anonymous use of data about individuals. Many companies, such as financial institutions, credit rating agencies, drugstores, health clinics, or pharmaceutical companies, have substantial customer information but are not able to monetize the information to the fullest extent possible because of laws protecting the identity of the customer. These companies may profile their customers based on demographic and behavioral information in the hopes of monetizing the data they possess without disclosing any individual's identifying information. Unfortunately, these profiles do not provide as robust a profile as possible, greatly inhibiting the potential for financial gain. Using the disclosed system, apparatus, and method described above to include additional profiling data points, including those that are objective, subjective, qualitative, quantitative, structured or unstructured, may enable these companies to increase the value of the data they are trying to sell without ever disclosing an individual's identifying information. For example, a company may be able to sell information based on a customer profile that provides more information about that customer's characteristics, without revealing any sensitive or identifying information about that customer. Likewise, the disclosed system, apparatus, and method may be used to generate a valuable profile of groups of customers, which may be sold to other companies without revealing sensitive or identifying information about any of the individuals related to that group.

A related sixth application is the valuation and sale of information on individuals. It may be valuable to package individuals into portfolios based on each individual's respective set of relationships to the characteristics (a "characteristic map"). In this context, the individuals may be grouped into one or more portfolios prior to integrating a business' data into each individual's respective characteristic map. Through the system, apparatus, and methods disclosed above, a business may assign a score, represented as a letter grade, numerical score, icon, color-coding, or any other scoring method in order to represent how valuable each portfolio is, both generally, and to a specific business. The scoring may be based on a variety of factors, such as data latency, data integrity, data volume, as well as the type of people whose characteristic-based profile is contained in the portfolio. For example, frequent travelers may be more valuable to airlines, hotels, and travel agencies. In another example, portfolios with highly granular characteristic profiles may be more valuable in general than a portfolio with substantial missing links, or "gaps", in the profiles.

Based on these scores, businesses may identify which portfolios of information they wish to purchase, and what price they should pay for accessing the information. Using the disclosed system, apparatus, and methods in this application, the businesses may pay for exclusive access to a certain portfolio. There may be a bidding procedure for access to some or all of the portfolios, or there may be a fixed price for accessing the portfolios for a given period of time.

Individual consumers may also use the disclosed system, apparatus, and methods. In this capacity, the customers may upload their personal information, including information acquired through voluntarily providing access to their social media accounts, contact lists, phone logs, SMS messages, emails, photos stored on an electronic device owned by the individual, and more. The disclosed system, apparatus, and methods may then be able to analyze the data and create a real-time characteristic profile of each individual. This profile may be uploaded wirelessly, through WiFi, cellular connections, RFID, Bluetooth, electromagnetic frequencies, or other wireless connections to a central data repository, such as a data warehouse, data mart, or even a personal cloud-storage facility owned exclusively by the individual. The data may then be transferred to the disclosed system, apparatus, or method, which would generate the profiles. Additionally, or alternatively, the individual may decide to store his or her personal data on a local or personal storage device in the cloud and may review the data before uploading to the analytics engine. The individual may even sift through the data, removing datum that the individual wishes to keep private. Doing so, however, would lower the score of the individuals profile and, therefore, decrease its value to a potential business.

A seventh application relates to determining the value of an organization's connections and affiliations on social media platforms. The above system, apparatus, and methods may be used to understand and measure characteristics such as an affiliated individual's reach, the strength of the connection between the individual and the organization, the strength of the connection between the individual and his or her personal social network and sub-networks, the trustworthiness of the connection with the individual, and the density of the organization's social network and that of its "fans", "followers", and "likes." Based on the measured relationships, an organization may measure its connections to understand which connections reach the most people, have the greatest impact on people (and which people), have the greatest ability to motivate action in others, and are interested in topics affiliated or connected (either directly or indirectly) with the organization. All of this may then be correlated back to the organization's own metrics, so that it may know who is a valuable social media connection, when, and for what reason.

In an eighth application, the system, method, and apparatus disclosed herein can be applied in the recruiting and human resources fields. The ability to analyze objective, subjective, quantitative, qualitative, structured, and unstructured data, may enable a company to identify a job applicant's or an existing employee's characteristics, such as personality type, cognitive methods of thinking, temperament and moodiness, as well as others. These data points can be observed unobtrusively through linguistic analytics, body language analytics, content analytics, and contextual analytics, among other methods known in the art, in order to determine (1) which characteristics and (2) which group of characteristics are positively or negatively correlated with factors the organization is interested in. For example, high or low performing employees, or employees who are correlated (either positively or negatively) with attrition. Moreover, a business may perform this analysis with respect to subordinate, mid-level, senior, or executive-level managers. As a result, when recruiting prospective employees, a company using the above system, method, and apparatus may gain a better understanding of how a given job applicant will fit into the business. For example, the ways in which the applicant is likely to contribute to the business, which other employees the applicant is likely to collaborate best with, whether the applicant is likely to progress through the company ranks and the manner that progression may occur, and which assignments, groups, departments, and responsibilities may cause the applicant the most difficulty.

For example, an engineering job applicant may have all the desired qualifications on paper, but, in truth, the applicant may be highly extraverted and open to new experiences, two personality characteristics of the "Big 5." As a result, this may indicate that, if hired for the engineering position the company is looking to fill, the applicant is likely to get bored and leave the company shortly after joining.

In a second example, the disclosed system, apparatus and methods can help identify existing employees who have a high correlation with other individuals that have already succeeded at higher levels of management. This enables a company to begin "grooming" those employees sooner, or ensure that they do not leave the company before being given an opportunity to receive a more senior management role.

In a third example, the disclosed system, method, and apparatus can be used to identify individuals who, based on their respective characteristics, work well together as a team, which problems they are most likely to encounter, and which problems they are encountering—in real time.

In a fourth example, the disclosed system, apparatus, and methods also helps human resource departments and managers avoid the "fundamental attribution error." Specifically, by identifying an individual's characteristics, that individual can be placed in a situation where she is most likely to succeed. Bold, inspiring, and visionary executives may be best suited for leading a company through a crisis, while a detailed-oriented, focused task manager may be better equipped to steward a business through stable periods.

In a fifth example, the disclosed system, apparatus, and methods can track how an employee's characteristics change over time, thereby enabling a business to identify, non-linear progression and development. Companies use performance benchmarks based on seniority, time with the company, experiences, and other factors to determine what skills an employee should have developed to "be on track." The disclosed system, apparatus, and methods, however, enables the business to understand that some employees may not progress in such a linear fashion, and may acquire what are typically considered more advanced skill sets before acquiring other more rudimentary skill sets.

A sixth example would be use by government agencies, defense contractors, or others tasked with protecting national security. Characteristic based screening may be used to identify which individuals have a greater propensity to be a terrorist, sex-offender, or spy. The disclosed system, apparatus, and methods may be used to develop a profile of an individual, or group of individuals in order to determine which individuals or groups have a stronger relationship to anti-social behavior, and should not be trusted.

In all of these examples it is important to remember that the disclosed system, apparatus, and methods may be used to identify characteristics such as personality type, cognitive dimensions of thinking, temperament, mood, and interests without requiring a written examination, psychological evaluation, or other time consuming and expensive process. All this information may be updated in real-time so that a company is able to monitor how these characteristics change amongst their employees over time. For example, management may discover that many of their employees within a specific division are becoming highly irritable and erratic in their temperament. This may signal that an environmental factor may be having a negative impact on the employees, or maybe even that a new supervisor is proving ineffective.

A ninth application relates to determining the effectiveness of an advertisement or message in the social media context. Using the system, apparatus, and methods disclosed above, an organization may (1) create a profile for an individual based on the characteristics that individual has the strongest relationships with and (2) embed within a message the necessary tools to identify each individual user's characteristic-based profile. These tools may include instructions to identify an individual either directly (based on information identifying a specific individual such as a username), or indirectly (based on information that does not identify any specific individual, but is related to a known individual, already stored in the system). These tools may also include instructions to create a new individual, and a new characteristic-based profile for that individual, if the user's information does not correspond to any individuals already stored in the system. The tools may further include instructions to alter the appearance or content of the advertisement or message, based on that particular user's profile. This ability to dynamically recognize the probability that a user will be more responsive to one type of content versus another, may be achieved through embedding certain characteristic-based profiling techniques within the advertisement, through creating a database of each user's characteristic-based profile that the advertisement is programmed to inspect before appearing in the user's inbox or on their social media webpage. Simultaneously, the software company, its advertisement agency, or the social media platform may receive reports regarding the behavior and response of each user as it pertains to a given advertisement or message. In this manner, a company may quickly identify if users with specific type of characteristic profile are generally responsive or engaged by the advertisement, or are unaffected by it. Based on this information, the company may alter the message that each user with a strong positive correlation to that characteristic profile would receive. Additionally, or alternatively, the company may wish to ensure that users with that characteristic profile are unable to open or view a given advertisement.

In this manner, the disclosed system, apparatus, and methods may be used to increase the relevancy of a message to each individual.

For example, User 1 (we do not even need to know a user's name to create the characteristic-based profile), could have the following characteristics:

51 years old,
Female,
A member of the "Bayside High School Group" on a social media platform,
Has an above average positive correlation with the cognitive mode of "Family",
Has a strong positive correlation with neuroticism, a Big 5 personality trait, and
Has a social network that overlaps substantially with that of User 2, a 17 year old female who is also a member of the "Bayside High School Group".

From this, the above system, apparatus, and methods may be used to create a characteristic-based profile for User 1. For example, an organization may wish to send an advertisement regarding new software to streamline drafting college applications. When the advertisement is received by User 1, the embedded tools may recognize the characteristic-based profile of User 1 and highlight the importance of applying to colleges early in the application process. User 1 may then forward that content to User 2, a fact that the software vendor may or may not know. Nevertheless, because the above system, apparatus, and methods can embed within the advertisement the ability to identify a user's characteristic-based profile, the advertisement would be able to recognize that User 2 is strongly correlated with the cognitive dimension of "Social Relationships", is 17 years old, a female, possesses a volatile and erratic temperament (and particularly so immediately before or after communicating with User 1), and has a strong negative correlation with the Big 5 personality trait of "Agreeableness." Thus, upon opening the message sent from User 1, the advertisement contained therein may actually highlight how the software will enable User 2 to complete the application process faster, providing more time to spend with friends and less time having to argue with her parents about completing the applications.

The same example may be applied with respect to advertisements sent to smart phones, mobile phones, tablet computers, PDAs, etc., even though different data points may be identified and used to create the characteristic-based profile of the user or owner of the device.

For purposes of explanation only, certain aspects and embodiments are described herein with reference to the components illustrated in FIGS. 1-16. The functionality of the illustrated components may overlap, however, and may be present in a fewer or greater number of elements and components. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Further, the sequences of events described in FIGS. 1-16 are exemplary and not intended to be limiting. Thus, other process stages may be used, and even with the processes depicted in FIGS. 1-16, the particular order of events may vary without departing from the scope of the present invention. Moreover, certain process stages may not be present and additional stages may be implemented in FIGS. 1-16. Also, the processes described herein are not inherently related to any particular system or apparatus and may be implemented by any suitable combination of components.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of identifying a value of information related to individuals, comprising:
   receiving, at a computer:
      characteristics related to the individuals;
      first relationships between the characteristics and the individuals; and
      organizational metrics;
   identifying groups of one or more of the individuals based on the first relationships;
   calculating second relationships between the groups and the organizational metrics, comprising:
   calculating third relationships between the groups and at least one of the characteristics,
      calculating fourth relationships between characteristics and organizational metrics, and
      calculating second relationships based on third relationships and forth relationship;
   calculating values for the groups based on the second relationships; and
   outputting the values.

2. The method of claim 1, comprising:
   receiving weights for the individuals, wherein (i) identifying the groups comprises identifying groups of one or more of the individuals using the weights, (ii) calculating the second relationships comprises calculating the second relationships using weights, and (iii) calculating the values for the groups based on the second relationships comprises calculating the values for the groups based on the second relationships using the weights.

3. The method of claim 1, comprising,
   receiving weights for the characteristics, wherein (i) identifying the groups comprises identifying groups of one or more of the individuals using the weights, (ii) calculating the second relationships comprises calculating the second relationships using the weights and (iii) calculating the values for the groups comprises calculating the values for the groups based on the second relationships using the weights.

4. The method of claim 1, comprising:
   receiving weights for the first relationships, wherein (i) identifying the groups comprises identifying groups using the weights, (ii) calculating the second relationships comprises calculating the second relationships using the weights, and (iii) calculating the values for the groups comprises calculating the values for the groups based on the second relationships using the weights.

5. The method of claim 1, comprising:
   receiving one or more second data items describing the quality of information regarding the characteristics, the individuals, and the first relationships; and
   wherein calculating values for the second groups comprises calculating values for the groups based on the second data items and the second relationships between the groups and the organizational metrics; and
   outputting the values.

6. The method of claim 1, comprising:
   representing the values with individual descriptors; and
   outputting the descriptors.

7. The method of claim 6, wherein an individual descriptor represents a monetary value.

8. A method of identifying a group of one or more characteristics related to an individual, comprising:
   receiving, at a computer, characteristics of individuals and first data items;
   calculating first relationships between the characteristics and the individuals, comprising:
      calculating second relationships between the characteristics and first data items,
      calculating third relationships between first data items and the individuals, and
      calculating first relationships based on second relationships and third relationships;
   identifying groups of one or more characteristics related to a specific one of the individuals based on the relationships; and
   outputting the groups.

9. A non-transitory computer-readable storage medium encoded with instructions which, when executed on a processor, perform a method of identifying a value of information related to individuals, the method comprising:
   receiving, at a computer:
      characteristics related to the individuals;
      first relationships between the characteristics and the individuals; and
      organizational metrics;
   identifying groups of one or more of the individuals based on one or more of the first relationships;
   calculating second relationships between the groups and the organizational metrics, comprising:
      calculating third relationships between the groups and at least one of the characteristics,
      calculating fourth relationships between characteristics and organizational metrics, and
      calculating second relationships based on third relationships and forth relationship;
   calculating values for the groups based on the second relationships; and
   outputting the values.

10. The storage medium of claim 9, comprising:
    receiving weights for the individuals, wherein (i) identifying the groups of one or more of the individuals comprises identifying groups of one or more of the individuals using the weights, (ii) calculating the second relationships comprises calculating the second relationships using the weights, and (iii) calculating the values for the groups comprises calculating the values for the groups based on the second relationships using the weights.

11. The storage medium of claim 9, comprising:
    receiving weights for the characteristics, wherein (i) identifying the groups of one or more of the individuals comprises identifying groups of one or more of the individuals using the weights, (ii) calculating the second relationships comprises calculating the second relationships using the weights and (iii) calculating the values for the groups comprises calculating the values for the groups based on the second relationships using the weights.

12. The storage medium of claim 9, comprising;
    receiving weights for the first relationships, wherein (i) identifying the groups of one or more of the individuals comprises identifying groups of one or more of the individuals using the weights, (ii) calculating the second relationships comprises calculating the second relationships using the weights, and (iii) calculating the values for the groups comprises calculating the values for the groups based on the second relationships using the weights.

13. The storage medium of claim 9, comprising;
receiving one or more second data items describing the quality of information regarding the characteristics, individuals, and first relationships; and
wherein calculating values for the groups comprises calculating values for the groups based on the second data items and the second relationships between the groups and the organizational metrics; and
outputting the values.

14. The storage medium of claim 9, comprising:
representing the values with individual descriptors; and
outputting the descriptors.

15. The storage medium of claim 14, wherein an individual descriptor represents a monetary value.

16. A non-transitory computer-readable storage medium encoded with instructions which, when executed on a processor, perform a method of identifying a group of one or more characteristics related to an individual, the method comprising:
receiving, at a computer, characteristics of individuals and first data items;
calculating relationships between the characteristics and the individuals, comprising:
calculating second relationships between the characteristics and first data items,
calculating third relationships between first data items and the individuals, and
calculating first relationships based on second relationships and third relationships;
identifying groups of one or more characteristics related to a specific one of the individuals based on the relationships; and
outputting the groups.

17. A characteristic-based server to identify values of information regarding individuals, the server comprising;
a grouping module to identify groups of individuals based on first relationships between individuals and characteristics, the identification based on second relationships between individuals and first data items and third relationships between first data items and characteristics, and groups of characteristics related to specific ones of the individuals based on the first relationships;
a relationship analysis module to calculate second relationships between a characteristics and groups of individuals;
a calculation module to calculate values for the second relationships.

18. The server of claim 17, wherein the relationship module is further operative to calculate the second relationships using weights.

19. The server of claim 17, wherein the calculation module is further operative to calculate the values using weights.

20. The server of claim 17, wherein the relationship module is further operative to calculate the second relationships based on second data items describing quality of information regarding the characteristics, individuals, and first relationships.

21. The server of claim 17, wherein the calculation module is further operative to represent the values with single descriptors.

* * * * *